(12) United States Patent
Cams et al.

(10) Patent No.: US 11,092,765 B2
(45) Date of Patent: Aug. 17, 2021

(54) OPTICAL TERMINATION ENCLOSURE WITH RUGGEDIZED SELF-SUPPORTING TETHERS

(71) Applicant: COMMSCOPE CONNECTIVITY BELGIUM BVBA, Kessel-Lo (BE)

(72) Inventors: Eddy Luc Cams, Bilzen (BE); Pieter Doultremont, Kermt-Hasselt (BE); Kurt Cornelissen, Hulshout (BE); Erwin Beckers, Werchter (BE); Patrick Jacques Ann Diepstraten, Heusden-Zolder (BE)

(73) Assignee: CommScope Connectivity Belgium BVBA, Kessel-Lo (BE)

( * ) Notice: Subject to any disclaimer, the term of this patent is extended or adjusted under 35 U.S.C. 154(b) by 393 days.

(21) Appl. No.: 16/304,047

(22) PCT Filed: May 22, 2017

(86) PCT No.: PCT/EP2017/062316
§ 371 (c)(1),
(2) Date: Nov. 21, 2018

(87) PCT Pub. No.: WO2017/202797
PCT Pub. Date: Nov. 30, 2017

(65) Prior Publication Data
US 2020/0319420 A1 Oct. 8, 2020

Related U.S. Application Data

(60) Provisional application No. 62/340,433, filed on May 23, 2016, provisional application No. 62/361,787, filed on Jul. 13, 2016.

(51) Int. Cl.
*G02B 6/44* (2006.01)

(52) U.S. Cl.
CPC ......... *G02B 6/4452* (2013.01); *G02B 6/4454* (2013.01)

(58) Field of Classification Search
CPC .......................... G02B 6/4452; G02B 6/4454
See application file for complete search history.

(56) References Cited

U.S. PATENT DOCUMENTS

| | | | | |
|---|---|---|---|---|
| 4,380,348 A | * | 4/1983 | Swartz | F16L 25/14 285/236 |
| 4,910,770 A | * | 3/1990 | Collins | H04Q 1/028 361/657 |

(Continued)

FOREIGN PATENT DOCUMENTS

| CN | 102007439 A | 4/2011 |
|---|---|---|
| CN | 105324696 A | 2/2016 |

(Continued)

OTHER PUBLICATIONS

"MJC Closure Installation Instruction: Small inline/cap-ended mechanical closure, XL/Large inline/cap-ended mechanical closure", TE Connectivity (2009), 4 pgs.

(Continued)

*Primary Examiner* — Peter Radkowski
(74) *Attorney, Agent, or Firm* — Merchant & Gould P.C.

(57) ABSTRACT

The present disclosure relates to enclosures such as optical termination enclosures for telecommunications networks. The enclosures can include housings for accommodating fiber pass-through cables and drop cables. In one example, the enclosure can include tethers having ruggedized fiber opt connectors for coupling to the drop cables or any other cable. The present disclosure also relates to a tether assembly that can include an overmold that anchors strength members to a cable jacket of the tether assembly.

15 Claims, 22 Drawing Sheets

(56) References Cited

U.S. PATENT DOCUMENTS

| | | | | |
|---|---|---|---|---|
| 5,363,440 | A * | 11/1994 | Daoud | H04Q 1/028 379/412 |
| 5,835,658 | A * | 11/1998 | Smith | G02B 6/4446 385/136 |
| 6,510,226 | B1 * | 1/2003 | Thomann | H04Q 1/035 379/413.04 |
| 6,573,455 | B1 * | 6/2003 | Radelet | H02G 15/113 174/92 |
| 7,013,074 | B2 | 3/2006 | Battey et al. | |
| 7,277,614 | B2 | 10/2007 | Cody et al. | |
| 7,379,119 | B1 * | 5/2008 | Schuetz | G08B 13/19632 348/375 |
| 7,428,366 | B2 | 9/2008 | Mullaney et al. | |
| 7,469,091 | B2 | 12/2008 | Mullaney et al. | |
| 7,686,519 | B2 | 3/2010 | Lu | |
| 7,751,675 | B2 | 7/2010 | Holmberg et al. | |
| 7,942,590 | B2 | 5/2011 | Lu et al. | |
| 8,213,760 | B2 | 7/2012 | Rudenick et al. | |
| 8,472,775 | B2 * | 6/2013 | Corbille | G02B 6/445 385/135 |
| 8,718,434 | B2 | 5/2014 | Gronvall et al. | |
| 9,400,363 | B2 * | 7/2016 | Coenegracht | H02G 15/013 |
| 2005/0213921 | A1 * | 9/2005 | Mertesdorf | G02B 6/3897 385/135 |
| 2006/0067636 | A1 * | 3/2006 | Bludau | G02B 6/4453 385/135 |
| 2007/0086721 | A1 * | 4/2007 | Dobbins | G02B 6/445 385/135 |
| 2007/0183732 | A1 * | 8/2007 | Wittmeier | G02B 6/4442 385/135 |
| 2009/0046985 | A1 * | 2/2009 | Gronvall | G02B 6/4442 385/135 |
| 2009/0060421 | A1 * | 3/2009 | Parikh | G02B 6/4442 385/71 |
| 2009/0252472 | A1 * | 10/2009 | Solheid | G02B 6/4454 385/135 |
| 2009/0290844 | A1 | 11/2009 | Mullaney et al. | |
| 2009/0304341 | A1 * | 12/2009 | Shimirak | H02G 15/013 385/135 |
| 2010/0061693 | A1 * | 3/2010 | Bran de Leon | G02B 6/4454 385/135 |
| 2010/0158465 | A1 * | 6/2010 | Smrha | G02B 6/4453 385/135 |
| 2010/0189404 | A1 * | 7/2010 | Rudenick | G02B 6/4455 385/135 |
| 2011/0052132 | A1 * | 3/2011 | Teymouri | G02B 6/4441 385/135 |
| 2011/0262095 | A1 * | 10/2011 | Fabrykowski | G02B 6/4466 385/135 |
| 2011/0268410 | A1 * | 11/2011 | Giraud | G02B 6/3897 385/135 |
| 2012/0230645 | A1 * | 9/2012 | Marmon | G02B 6/4454 385/135 |
| 2013/0056599 | A1 * | 3/2013 | Baker | G02B 6/4452 248/220.22 |
| 2013/0084050 | A1 * | 4/2013 | Vastmans | G02B 6/4448 385/135 |
| 2013/0243386 | A1 * | 9/2013 | Pimentel | G02B 6/4441 385/135 |
| 2013/0294739 | A1 * | 11/2013 | Allen | G02B 6/4444 385/135 |
| 2014/0193130 | A1 * | 7/2014 | Mullaney | G02B 6/46 385/135 |
| 2014/0219621 | A1 | 8/2014 | Barnette, Jr. et al. | |
| 2014/0219622 | A1 * | 8/2014 | Coan | G02B 6/4471 385/135 |
| 2014/0241670 | A1 | 8/2014 | Barnette, Jr. et al. | |
| 2014/0355936 | A1 * | 12/2014 | Bund | G02B 6/3802 385/81 |
| 2015/0093090 | A1 * | 4/2015 | Aznag | G02B 6/4471 385/135 |
| 2015/0137461 | A1 * | 5/2015 | Coenegracht | H02G 15/04 277/618 |
| 2015/0168663 | A1 * | 6/2015 | Aznag | G02B 6/4454 385/135 |
| 2015/0168664 | A1 * | 6/2015 | Coenegracht | H02G 15/013 385/135 |
| 2017/0045701 | A1 | 2/2017 | Diepstraten et al. | |

FOREIGN PATENT DOCUMENTS

| | | | | |
|---|---|---|---|---|
| WO | 2009/102912 | A1 | 8/2009 | |
| WO | WO-2013149846 | A1 * | 10/2013 | G02B 6/4446 |
| WO | 2013/177016 | A1 | 11/2013 | |
| WO | WO-2014005916 | A2 * | 1/2014 | H02G 15/04 |
| WO | WO-2014005918 | A2 * | 1/2014 | G02B 6/4444 |
| WO | WO-2014005916 | A3 * | 3/2014 | H02G 15/013 |
| WO | WO-2014005918 | A3 * | 3/2014 | G02B 6/4444 |
| WO | 2014/096134 | A1 | 6/2014 | |
| WO | 2014/123940 | A1 | 8/2014 | |
| WO | 2014/167447 | A1 | 10/2014 | |
| WO | 2014/197894 | A1 | 12/2014 | |
| WO | 2015/028428 | A1 | 3/2015 | |
| WO | 2015/150204 | A2 | 10/2015 | |
| WO | 2016/071394 | A2 | 5/2016 | |
| WO | 2016/205340 | A1 | 12/2016 | |
| WO | 2017/046359 | A1 | 3/2017 | |

OTHER PUBLICATIONS

"MJC Mechanical joint closure", TE Connectivity, (2012), 2 pgs.
International Search Report and Written Opinion of the International Searching Authority for International Patent Application No. PCT/EP2017/062316 dated Oct. 17, 2017, 17 pages.

* cited by examiner

OPTICAL TERMINATION ENCLOSURE WITH RUGGEDIZED SELF-SUPPORTING TETHERS

CROSS-REFERENCE TO RELATED APPLICATIONS

This application is a National Stage Application of PCT/EP2017/062316, filed on May 22, 2017, which claims the benefit of U.S. Patent Application Ser. No. 62/340,433, filed on May 23, 2016, and claims the benefit of U.S. Patent Application Ser. No. 62/361,787, filed on Jul. 13, 2016, the disclosures of which are incorporated herein by reference in their entireties. To the extent appropriate, a claim of priority is made to each of the above disclosed applications.

TECHNICAL FIELD

The present disclosure relates generally to components for fiber optic networks. More particularly, the present disclosure relates to self-supporting axial tension tethers used in sealed, re-enterable enclosures of fiber optic distribution networks.

BACKGROUND

Fiber optic distribution networks are expanding in part because service providers want to deliver high bandwidth communication capabilities to customers (i.e., subscribers). Fiber to the x (FTTX) refers to any broadband network architecture that uses optical fiber to provide all or part of the local loop used for last mile telecommunications. More specific broadband architectures include fiber to the curb (FTTC), fiber to the distribution point (FTTdp), fiber to the premises (FTTP) and fiber to the desktop (FTTD). Typical fiber optic network architectures include a plurality of fiber optic cables distributed outwardly from a central location (e.g., a central office) towards subscriber locations at the outer edge of the network. Over time there has been a continual movement toward extending the fiber optic portion of the communications network closer to the edge of the network.

Extending the fiber optic portion of a communications network closer to homes and businesses has expanded the deployment of optical termination enclosures (OTEs). An OTE is an enclosure that is designed to facilitate splicing and termination of one or more fiber optic cables. A typical OTE has a set of cable ports through which fiber optic cables enter the OTE. One or more of the cable entry ports may accommodate "feeder" cables that connect to upstream points (such as a central office of other type of telecommunication company installation). One or more of the other cable entry ports may accommodate "drop" cables that connect to downstream points in the communications network, such as homes and businesses.

OTEs are frequently mounted on utility poles, walls, utility boxes, and other outdoor locations. Because OTEs are mounted outdoors, they are exposed to various environmental elements such as heat, cold, dust, sunlight, rain, snow, plants, animals, and so on. Thus, a typical OTE is environmentally sealed.

In a typical fiber optic distribution network, sealed and re-enterable enclosures such as OTEs can be used to provide access to the optical fibers of the distribution cables. Commonly, multi-fiber distribution cables are passed through the enclosures and optical fibers are accessed within the enclosures. Often, some of the optical fibers of the multi-fiber distribution cables are accessed within the enclosures while the remainder of the optical fibers are passed through the enclosures and routed downstream to subsequent enclosures. Splice trays, passive optical splitters and wavelength division multiplexers can be provided within the enclosures. In certain examples, optical fibers accessed from distribution cables can be coupled to optical components (e.g., passive optical splitters or wavelength division multiplexers). Outputs of the optical components can be coupled to drop cables routed from the enclosures. In certain examples, the enclosures can include ruggedized adapter ports for allowing pre-connectorized drop cables to be connected to the fibers accessed from the distribution cables. In other examples, accessed fibers of the distribution cables can be spliced to optical fibers corresponding to drop cables routed out of the enclosures through sealed ports. Example enclosures of the type describe above are disclosed at U.S. Pat. Nos. 8,213,760; 8,718,434; and 7,013,074.

SUMMARY

Aspects of the present disclosure relate to an enclosure such as an OTE having exterior tethers terminated by ruggedized fiber optic connectors. Preferably, the tethers are relatively short and flexible. In certain examples, the tethers allow the enclosure to be readily coupled to cables (e.g., drop cables) from different directions by merely bending the tethers. The tethers can be self-supporting to provide axial retention relative to a cable jacket. In certain examples, the tethers can be clamped, or otherwise fixed, anchored, or secured to a sealing block or sealing assembly at any location because strength members are anchored relative to the cable jacket. Thus, the tethers assist in cable management and can be spliced at any desired location. Also, the tethers can allow enclosures to be mounted in relatively small locations such as a handholes while still allowing the enclosures to be readily coupled to drop cables.

The tether can be factory manufactured with the strength members overmolded to the jacket, with one end of the tether connectorized and with the other end of the tether including an optical fiber that extends beyond the overmold so as to be readily accessible for splicing. The tether can be delivered to the field and installed at a closure or other telecommunications component. Because the strength members are anchored to the cable jacket by the overmold, the strength members need not be separately handled or anchored in the field. Instead, anchoring of the tether can be efficiently achieved by anchoring the jacket in place. The extension of the optical fiber (which can be buffered or unbuffered) beyond the overmold can provide sufficient fiber length for fusion splicing and for routing the optical fiber to a splice mounting location.

Another aspect of the present disclosure relates to a telecommunications component configured for accommodating a pass-through cable and also including a plurality of ruggedized tethers adapted to be optically coupled to optical fibers accessed from the pass-through cable.

In certain examples, the component can include a housing containing a tray structure for managing the optical fibers accessed from a pass-through cable and also for managing pass-through fibers of the pass-through cable that are passed-through the housing of the component. In certain examples, the tray structure can include a fiber routing tray defining a pass-through path. In certain examples, the tray structure can include a splice tray. In certain examples, the tray structure can be mechanically coupled to a sealing subassembly used to seal the pass-through cable and the tethers. In certain examples, the sealing subassembly can also function to seal the enclosure.

In certain examples, the enclosure can have a butt-style configuration with a closed end and an opposite open end. In certain examples, tethers and pass-through cables can be routed into and out of the enclosure through the open end and the sealing subassembly can be mounted at the open end of the enclosure. In certain examples, the component can include ruggedized tethers for connecting drop cables to the fibers of the pass-through cable accessed within the housing. In certain examples, the ruggedized tethers can be relatively short. In certain examples, the ruggedized tethers can have total exterior lengths shorter than a 1.25 times a length of the housing. In certain examples, the ruggedized tethers have total exterior lengths less than 3 or 4 times as long as the length of their corresponding ruggedized fiber optic connectors. As used herein, the total exterior length of a ruggedized tether is the distance the tether extends from the housing to the outer tip of the ruggedized connector of the tether.

Certain examples of the present disclosure relate to features and structures for facilitating assembling and installing fiber optic enclosures. In certain examples, the enclosure can have separate housing pieces that are mated together. In certain examples, one or more of the housing pieces can have staging structures such as staging projections that can stage optical components desired to be mounted within the housing or at least partially within the housing at a predetermined location relative to at least one of the housing pieces. In certain examples, the staging structure can include a projection integrally formed with an interior of one of the housing pieces. In certain examples, a projection can similarly engage a corresponding component desired to be staged within the housing. In certain examples, the corresponding component can include a tray structure. In certain examples, the tray structure can include a fiber management tray. In certain examples, the tray structure can include a fiber management tray and a splitter tray pivotally connected to the fiber management tray. In certain examples, the tray structure can define a receptacle for frictionally receiving the staging projection. In certain examples, the receptacle can include at least one flexible arm that flexes when the staging projection is received within the receptacle. In certain examples, the receptacle can include opposing retention numbers having flexible, cantilevered configurations. In certain examples, opposing retention numbers can be configured to receive the staging projection therebetween and can frictionally engage the staging projection. In certain examples, the staging projection and/or flexible retention arms can include other structures (e.g., ribs, surface roughness, texturing, bumps, etc.) for enhancing a gripping action.

Still another aspect of the present disclosure relates to a telecommunications enclosure having first and second housing pieces that mate together to form a housing. At least one of the housing pieces includes a staging structure adapted to engage a component desired to be mounted within the housing. In this way, the component can be staged within the first housing piece so that a technician assembling the housing can hold the first housing piece and the staged component with one hand and can maneuver the second housing piece into mating engagement with the first housing piece to secure the component within the housing. In certain examples, the staging structure provides retention by friction and does not require a separate snap, catch, or latch to be manually released or engaged to engage and disengage the component from the staging structure. Instead, in one example, the component can be inserted on the staging structure in one single motion and can be removed from the staging structure in one single opposite motion.

Another aspect of the present disclosure relates to a tether assembly. The tether assembly can include a cable jacket that has a first end and a second end. The tether assembly also includes a fiber optic connector mounted at the first end of the cable jacket. At least one optical fiber can extend through the cable jacket and project beyond the second end of the cable jacket. The tether assembly can include strength members that extend through the cable jacket. The strength members can include end portions that project beyond the second end of the cable jacket. The tether assembly can further include an overmold that anchors the end portions of the strength members to the second end of the cable jacket.

Still another aspect of the present disclosure relates to a method for securing strength members to a cable jacket. The strength members can include end portions that project beyond an end of the cable jacket. The method includes a step of applying an overmold over the end of the cable jacket such that the strength members are anchored relative to the cable jacket.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the examples disclosed herein are based.

DETAILED DESCRIPTION

Figure 1:
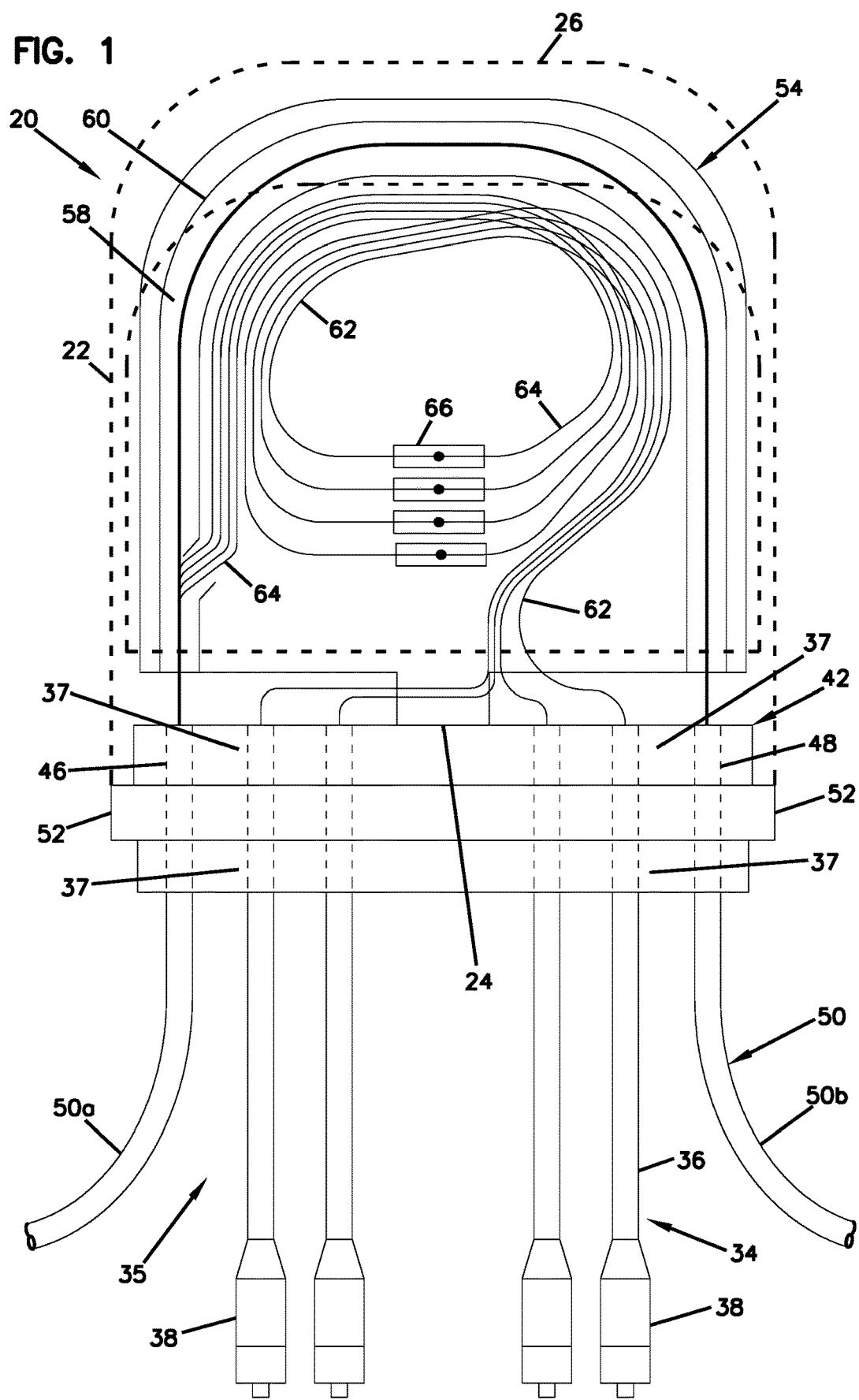
FIG. 1 is a schematic view of an optical fiber distribution apparatus in accordance with the principles of the present disclosure.
Figure 2:
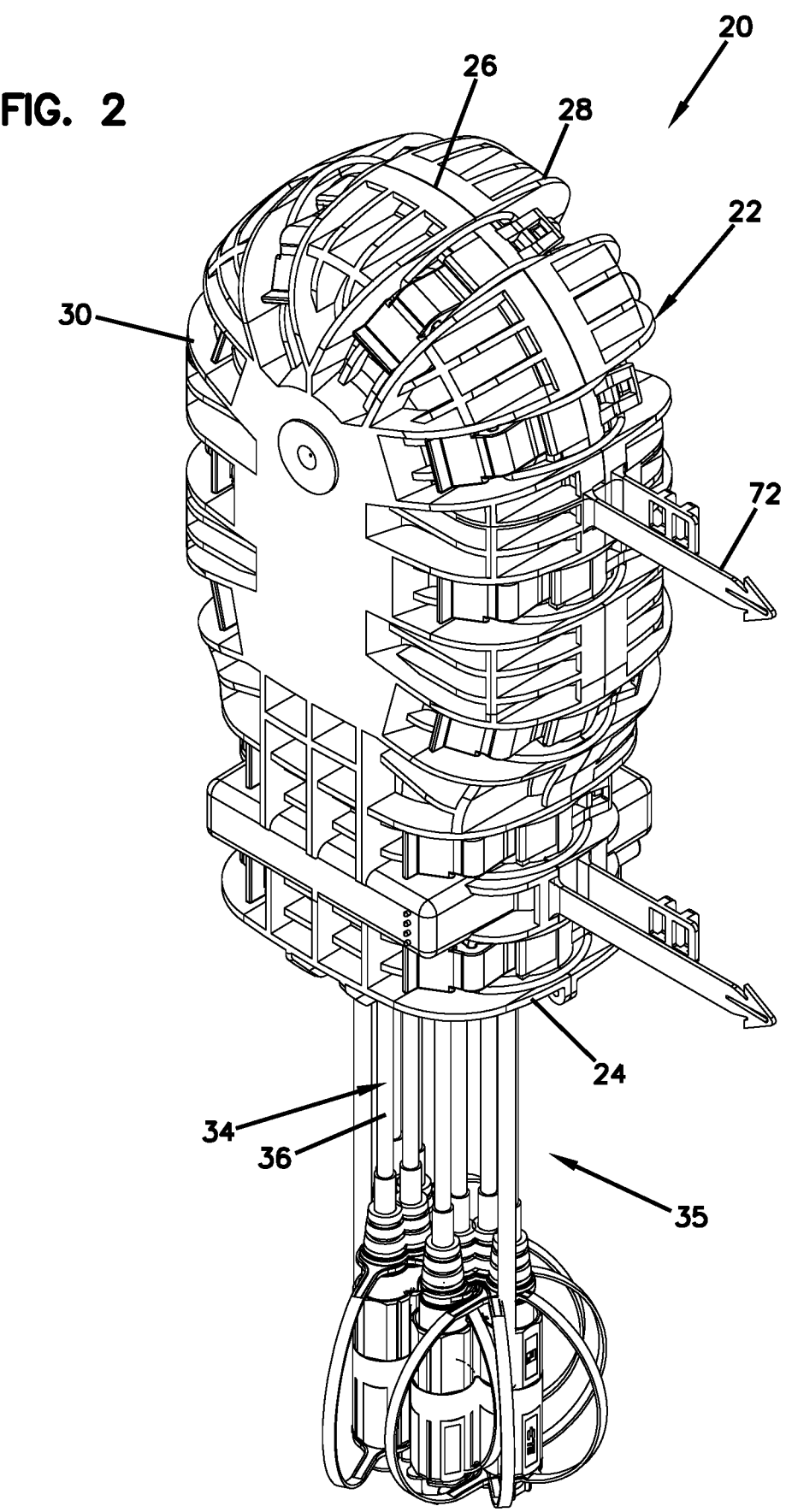
FIG. 2 is a perspective view of the optical fiber distribution apparatus of FIG. 1.
Figure 3:
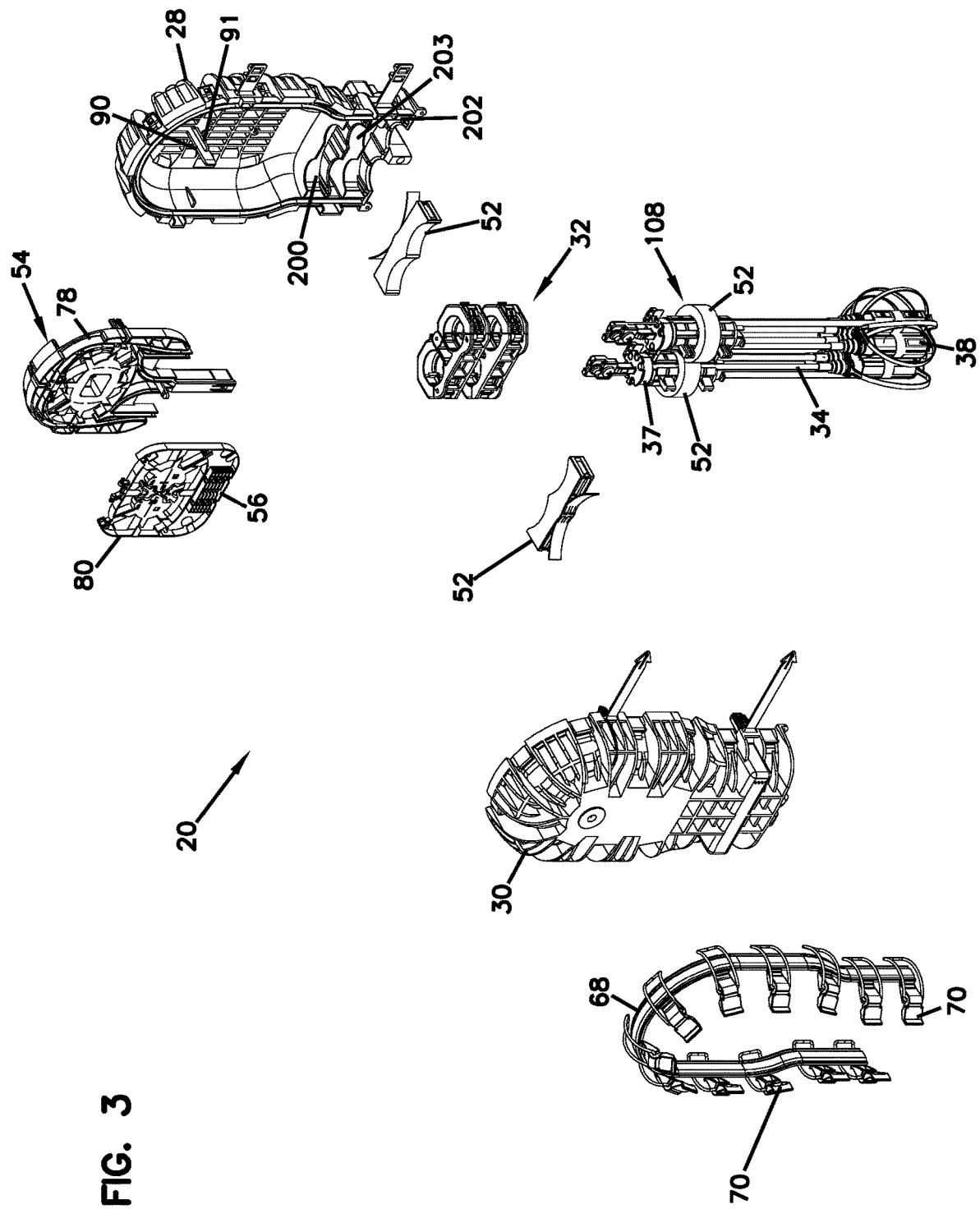
FIG. 3 is an exploded view of the optical fiber distribution apparatus of FIG. 1.
Figure 4:
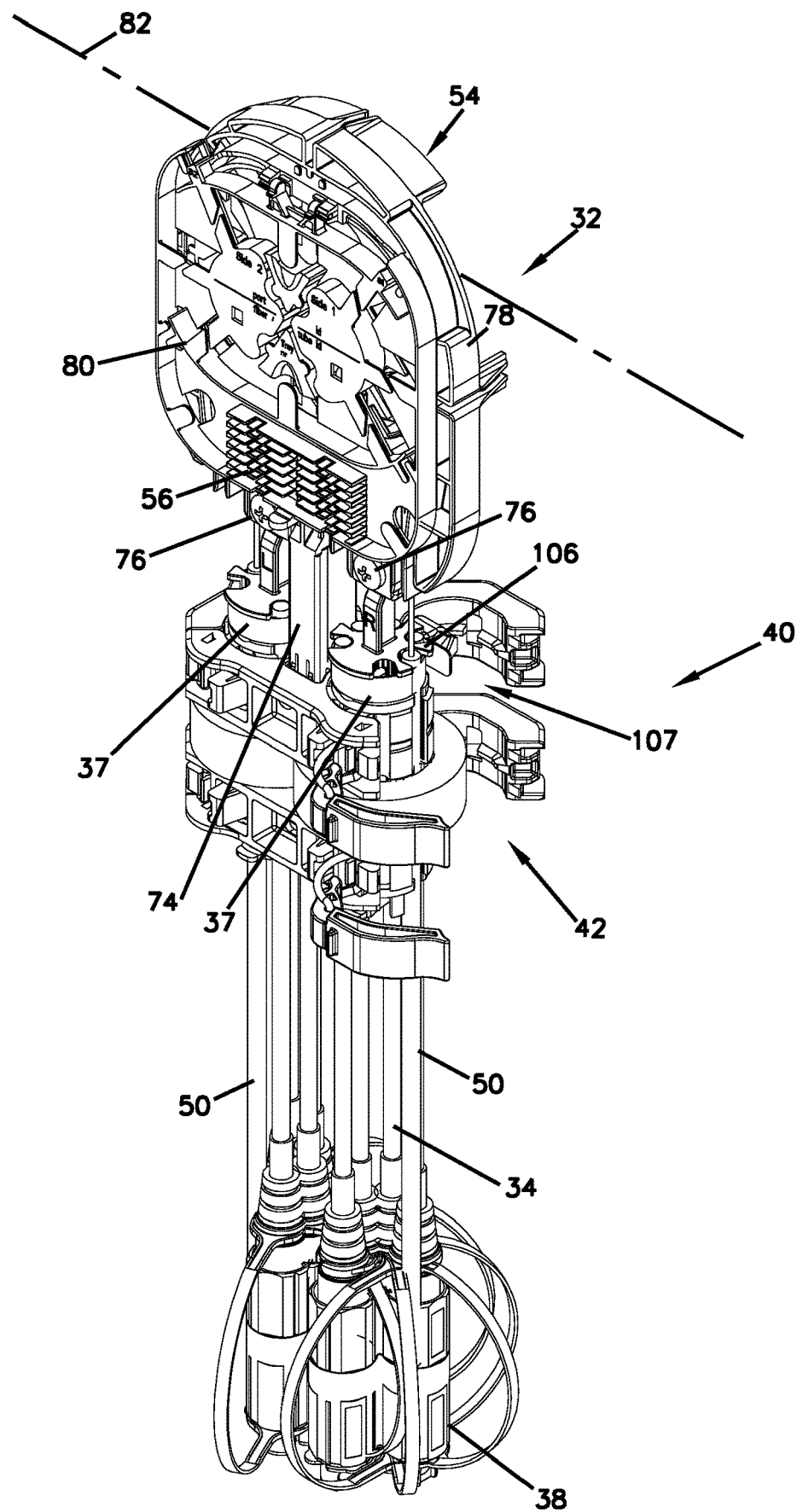
FIG. 4 is a perspective view of a fiber optic assembly adapted to be partially installed within a housing of the optical fiber distribution apparatus of FIG. 1.
Figure 5:
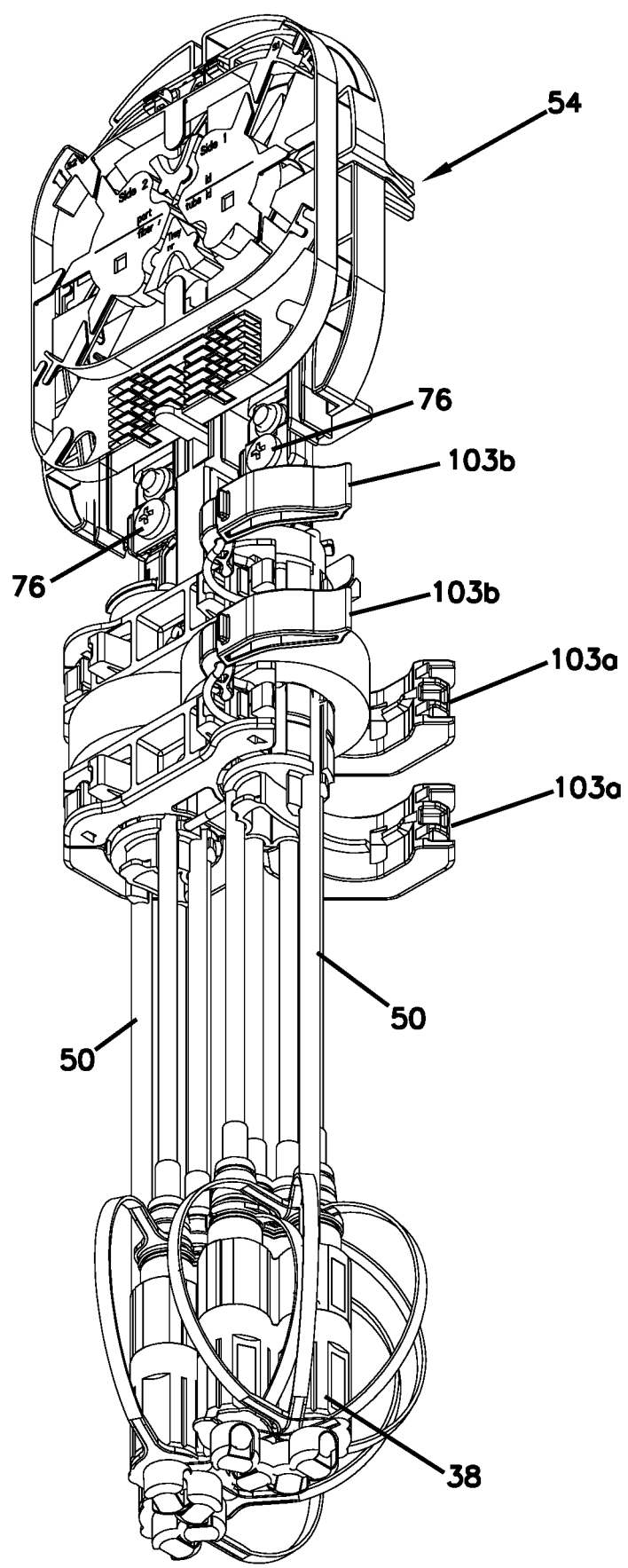
FIG. 5 is another perspective view of the fiber optic assembly of FIG. 4.
Figure 6:
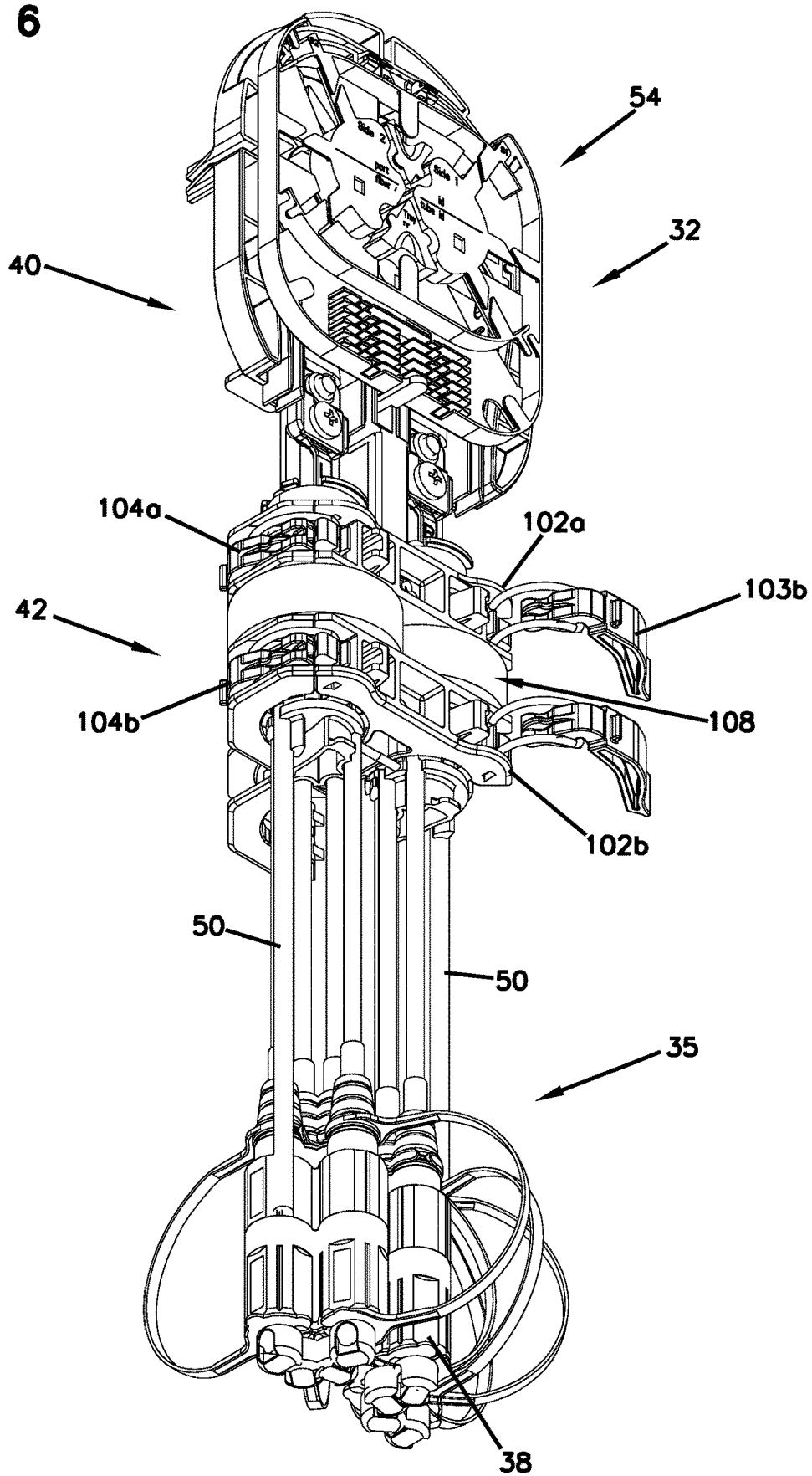
FIG. 6 is a further perspective view of the fiber optic assembly of FIG. 4.

FIGS. 1-3 illustrate an optical fiber distribution apparatus 20 in accordance with the principles of the present disclosure. The optical fiber distribution apparatus 20 includes a housing 22 having an open end 24 and an opposite butt end 26 (i.e., a closed end). The housing also includes first and second housing pieces 28, 30 that mate together to define the housing 22. Each of the first and second housing pieces 28, 30 can extend from the butt end 26 to the open end 24 of the housing 22. The optical fiber distribution apparatus 20 also includes a fiber optic assembly 32 (see FIGS. 3-10) adapted to be installed partially within the housing.

As shown at FIGS. 3-10, fiber optic assembly 32 includes a plurality of tethers 34 (e.g., tether assemblies) having optical tether cables 36 with free ends connectorized by fiber optic connectors 38 (e.g., LC connector, SC connector, MPT connector, HMFOC, or another fiber optic connector). In certain examples, the fiber optic connectors 38 are ruggedized connectors, although alternatives are possible. The tethers 34 are configured to project from the open end 24 of the housing 22 when the fiber optic assembly 32 is installed at the housing 22. The tethers 34 thus form an exterior portion 35 of the fiber optic assembly 32. The fiber optic assembly 32 also includes an interior portion 40 that mounts inside an interior of the housing 22 when the fiber optic assembly 32 is installed at the housing 22. The interior portion 40 of the fiber optic assembly 32 includes a sealing subassembly 42 that mounts within the housing 22 adjacent to the open end 24 of the housing 22 when the fiber optic assembly 32 is installed at the housing 22. The sealing subassembly 42 includes a cable sealant 37 for sealing drop cable ports 44 that receive the optical tether cables 36 and for sealing first and second pass-through cable ports 46, 48 in which a pass-through cable 50 can be routed and sealed. The sealing subassembly 42 can also include housing sealant 52 for sealing the open end 24 of the housing 22.

The interior portion 40 of the fiber optic assembly 32 also includes a tray structure 54 mechanically coupled to the sealing subassembly 42. The tray structure 54 is positioned between the sealing subassembly 42 and the butt end 26 of the housing 22 when the fiber optic assembly 32 is installed at the housing 22. The tray structure 54 can include a plurality of splice holders 56 and a plurality of fiber routing paths. At least one of the fiber routing paths can define a fiber pass-through path 58 for guiding pass-through fibers 60 of the pass-through cable 50 as the pass-through fibers 60 are routed from the first pass-through cable port 46 to the second pass-through cable port 48. In certain examples, the fiber pass-through path 58 extends from the first pass-through cable port 56 up into the housing 22, follows a curved path along the butt-end 26 of the housing 22 so as to reverse directions, then extends back down through the housing to the second pass-through cable port 48. In certain examples, the tray structure 54 can include fiber storage structures such as additional fiber paths or spools for looping or otherwise storing excess fiber on the tray structure 54. In certain examples, excess length of the pass-through fibers 60 can be stored in a coiled or looped fashion on the tray structure 54.

As described above, the optical fiber distribution apparatus 20 is described as having a housing having an open end and a butt end. It will be appreciated that aspects of the present disclosure are also applicable to other types of housings such as housings in which cables (e.g., pass-through cables and/or drop cables) are routed in and out of the housing from opposite ends of the housing. This type of housing can be referred to as a straight pass-through housing. In still other examples, housings in accordance with the principles of the present disclosure may have cables that enter and exit the housing at right angles from one another or at other angles relative to one another.

In certain examples, the optical tether cables 36 can be loaded into the sealing subassembly 42 at the factory. Additionally, optical fibers 62 (i.e., tether fibers) of the tethers 34 can be routed at the factory from the optical tether cables 36 to the tray structure 54. In this way, the optical fibers can be stored, managed, and staged at the tray structure 54. Once the tethers 34 have been secured in the sealing subassembly 42 and the tether fibers 62 routed to the tray structure 54, the housing 22 can be installed at the factory over the tray structure 54 and the sealing subassembly 42. As described subsequently, a staging structure can be used to assist in the assembly process. The optical fiber distribution apparatus 22 can then be shipped to the field for installation in the field. Once in the field, a technician can open the housing 22 to access the sealing subassembly 42 and the tray structure 54. The staging structure can be configured for allowing the fiber optic assembly 32 to be easily disengaged from the housing to access the sealing structure, and then re-engaged after access has been completed.

In the field, the pass-through cable 50 can be processed so as to expose optical fibers of the pass-through cable 50. For example, a section of the outer jacket of the pass-through cable 50 may be removed. Once the optical fibers of the pass-through cable 50 have been exposed, the pass-through cable can be installed within the housing 22. For example, jacketed portions 50a, 50b of the pass-through cable 50 can be installed within the pass-through ports 46, 48. Additionally, exposed optical fibers of the pass-through cable 50 can be routed and managed on the tray structure 54. As indicated above, certain ones of the optical fibers of the pass-through cable 50 are pass-through fibers 60 that are not cut and that extend continuously through the optical fiber distribution apparatus 20 from a first section 50a of the pass-through cable 50 supported at the pass-through port 46 to a second section 50b of the pass-through cable 50 secured at the pass-through cable port 48. Other optical fibers 64 of the pass-through cable 50 may be cut, routed on the tray structure 54 and spliced to the tether fibers 62. Such optical fibers 64 can be referred to as accessed fibers 64. In certain examples, the splices can be fusion splices that are protected by splice protectors 66 (e.g., a protective tube or sleeve). Splice protectors 66 can often have a shape-memory construction activated by heat and can contain thermally activated adhesive (e.g., heat shrink tubes that contain thermally activated adhesive). The splice protector 66 can be stored and protected by splice holders 56 of the tray structure 54. The splice holders 56 can include grooves, slots, grips, fingers, recesses or other structures suitable for holding splice protectors 66.

Referring back to FIGS. 2 and 3, the housing 22 can have a dome-style configuration with the butt end 26 positioned opposite from the open end 24. In certain examples, the first and second housing pieces 28, 30 can be half-pieces that mate at a sealed interface that extends about a perimeter of the housing 22. In certain examples, the sealed interface is sealed by a sealing element such as a gasket 68 that extends around the perimeter of the housing 22 and is compressed between the first and second housing pieces 28, 30. In certain examples, clamps 70 or other retaining structures can be positioned about the perimeter of the housing 22 to clamp the first and second housing pieces 28, 30 together and to adequately compress the gasket 68. In certain examples, a strap 72 or other structure can be used to secure the first and second housing pieces 28, 30 together when the first and second housing pieces 28, 30 are in an open position so that one or both of the housing pieces 28, 30 are prevented from being separated from one another and lost.

In certain examples, the exterior portion 35 of the fiber optic assembly 38 (i.e., the tethers 34) and the interior portion 40 of the fiber optic assembly 38 (i.e., the sealing subassembly 42 and the tray structure 54) can be installed with respect to the housing 22 as a unit. For example, the tethers 34 can be fixed (e.g., clamped) in place relative to the sealing subassembly 42 at the factory. Also, the sealing subassembly 42 can be mechanically connected to the tray structure 54 at the factory. For example, a connection member 74 is shown connecting the tray structure 54 to the sealing subassembly 42. In certain examples, the connection can be snap-fit connection, integrally molded connection, a fastened connection or other type of a connection. Additionally, fasteners 76 can also be used to secure components of the sealing subassembly 42 to the tray structure 54.

In certain examples, the tray structure 54 can include a fiber routing tray 78 mechanically fixed relative to the sealing subassembly 42 and a splice tray 80 pivotally connected to a front side of the fiber routing tray 78. A latch 81 can be used to selectively secure the splice tray 80 in a position adjacent to the fiber routing tray 78. The fiber routing tray 78 can be mechanically fixed relative to the sealing subassembly 42 and can define the pass-through path 58 as well as can define numerous other fiber routing paths for routing and storing optical fiber. The paths can be formed by walls, bend radius protectors, grooves, slots, tabs or other structures on the tray.

The splice tray 80 can include the splice holders 56 and can also include spools, bend radius limiters, tabs, fiber routing paths, and other structures for managing optical fibers. The splice tray 80 can be pivotally connected to the fiber routing tray 78 at a pivot axis 82 adjacent a top end of the fiber routing tray 78. It will be appreciated that optical fibers are preferably routed between the fiber routing tray 78 and the splice tray 80 adjacent to the pivot axis 82 so that the fibers do not interfere with the ability of the splice tray 80 to pivot relative to the fiber routing tray 78.

Certain aspects of the present disclosure relate to structures for facilitating installing the fiber optic assembly 32 with respect to the housing 22. Specifically, the optical fiber distribution apparatus 20 can include staging structures that assist in positioning and holding particular components at desired positions relative to the first or second housing piece 28, 30. In this way, since the component is staged, a technician is not required to hold the component in place relative to the housing piece. Thus, the technician has a free hand to handle the other housing piece so that the two housing pieces can be readily mated together while the component stays at the proper position within the housing.

Figure 7:
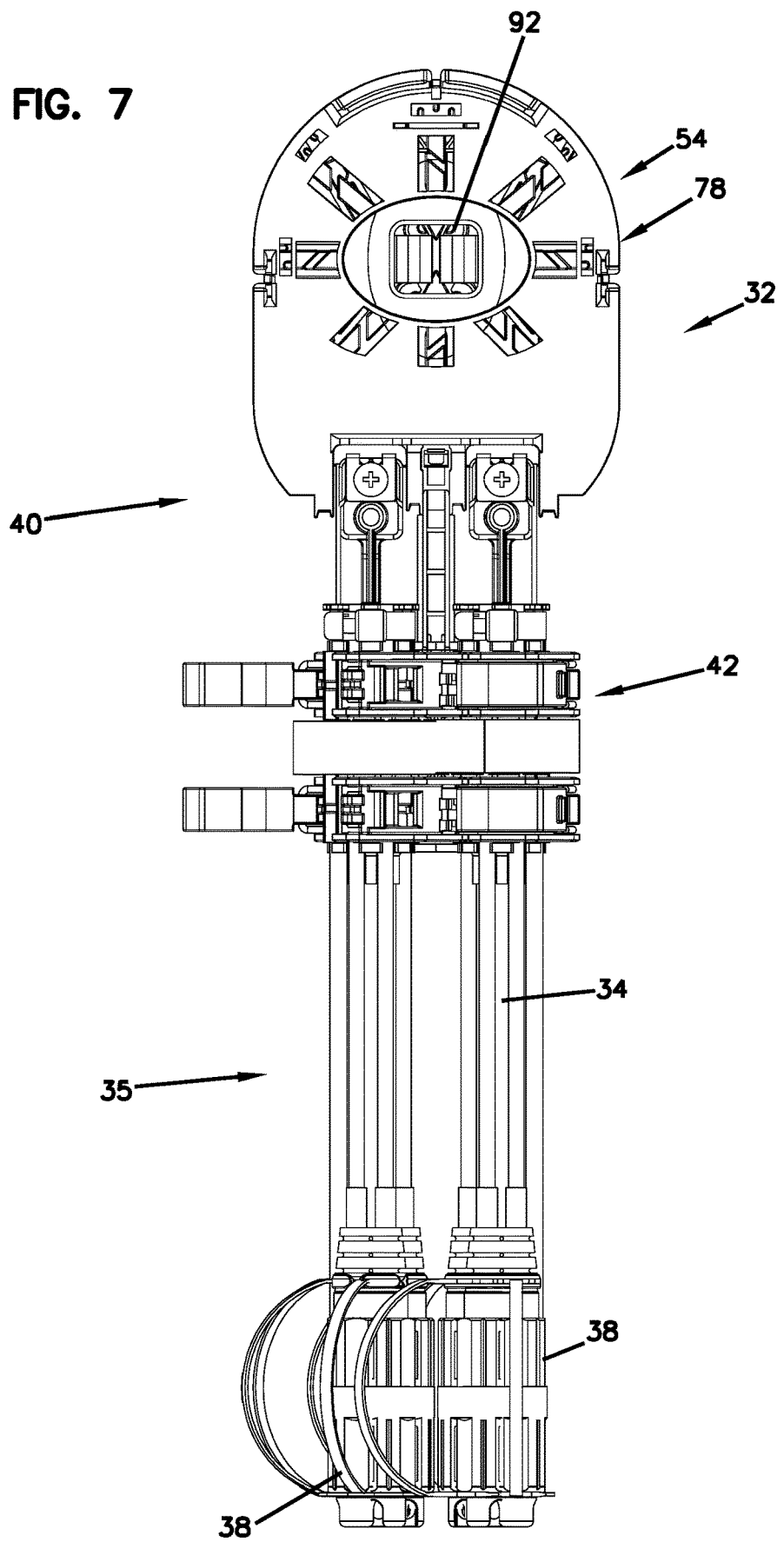
FIG. 7 is still another view of the fiber optic assembly of FIG. 4.
Figure 8:
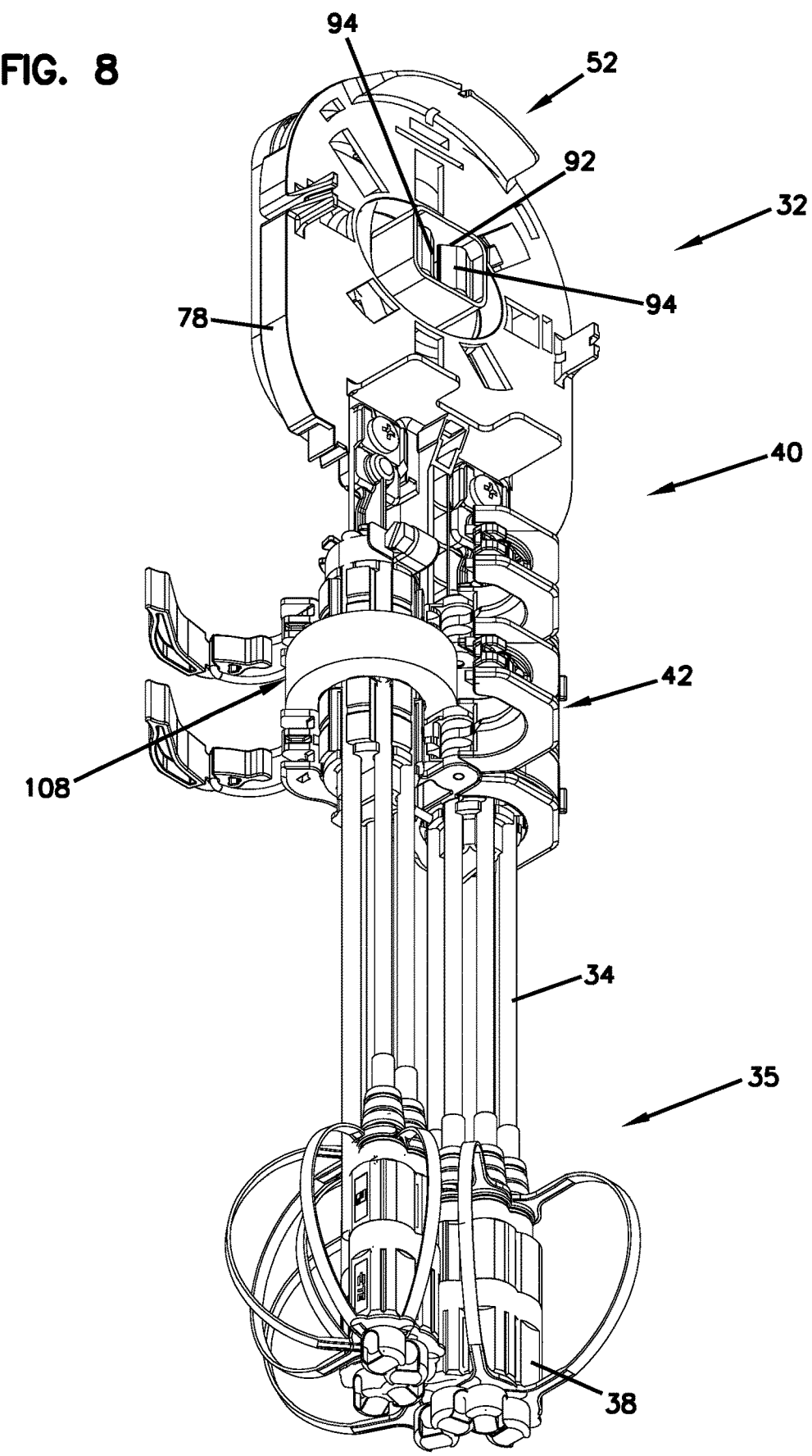
FIG. 8 is a further view of the fiber optic assembly of FIG. 4.
Figure 9:
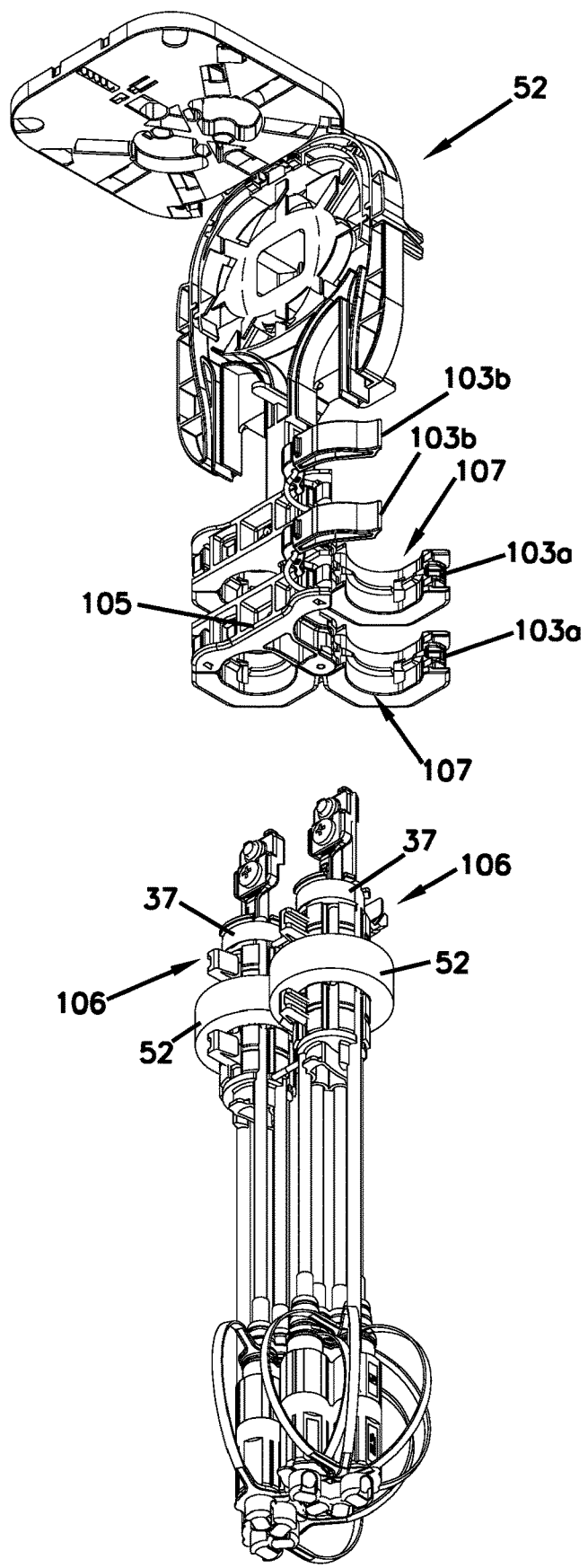
FIG. 9 is a partially exploded view of the fiber optic assembly of FIG. 4.
Figure 10:
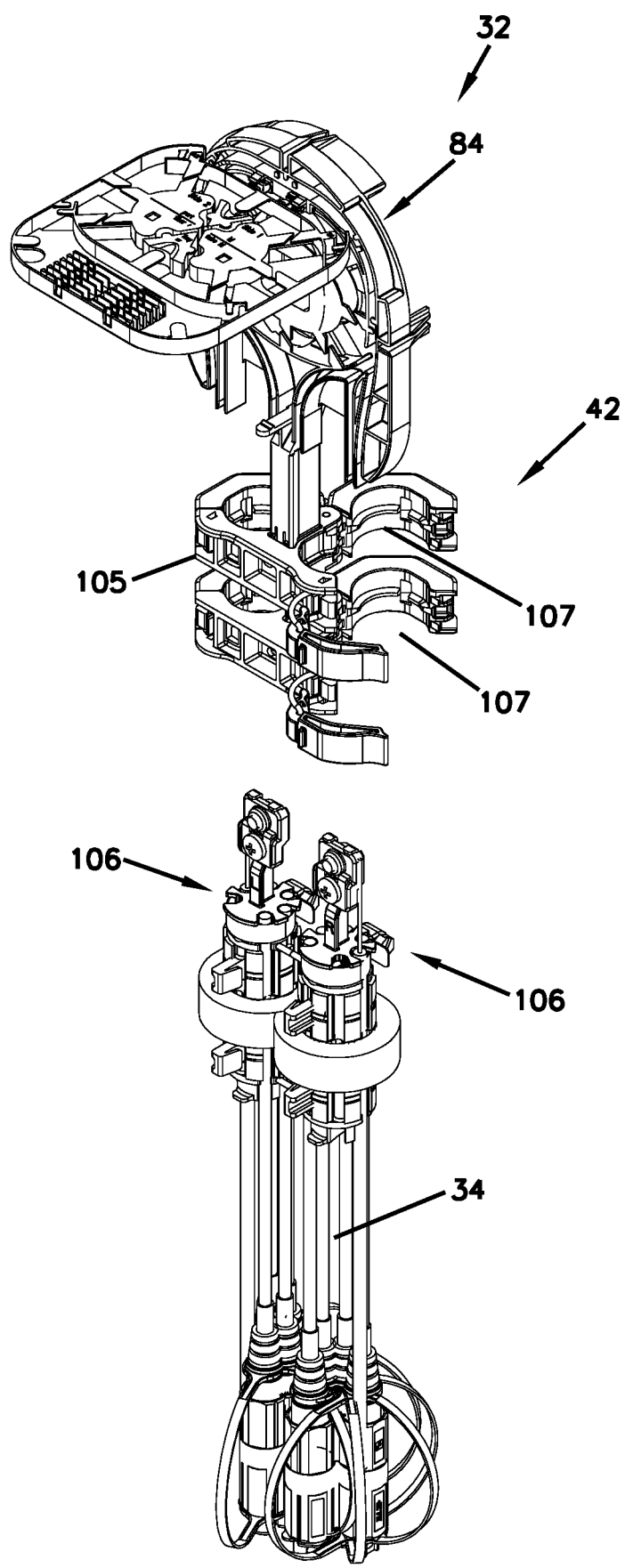
FIG. 10 is another partially exploded view of the fiber optic assembly of FIG. 4.
Figure 11:
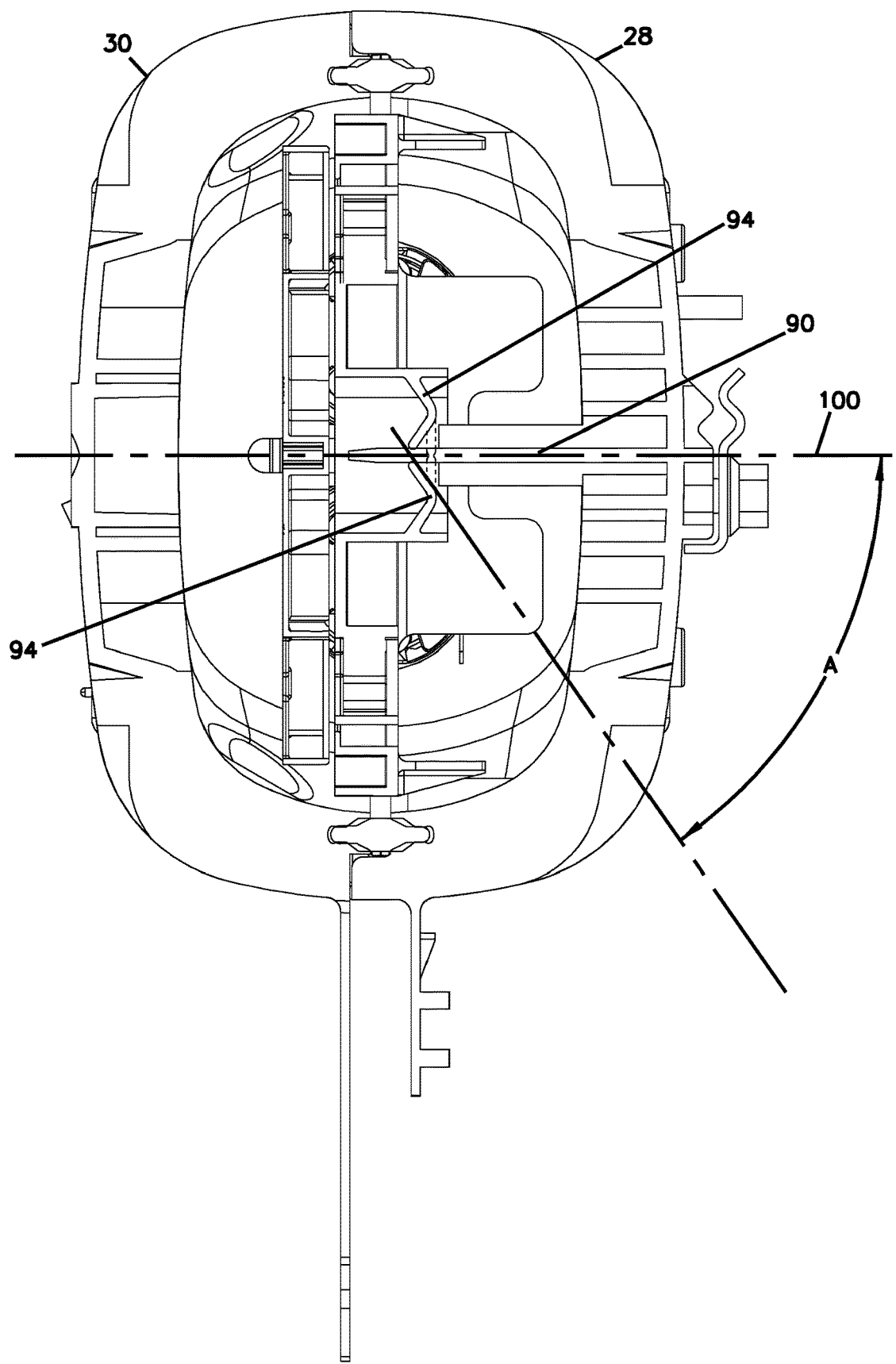
FIG. 11 shows the fiber optic assembly of FIG. 4 mechanically interfacing with a staging structure integrated with the housing of the optical fiber distribution apparatus of FIG. 1.

Referring to FIGS. 3 and 11, an example staging structure is depicted as a staging projection 90 integrally formed with the first housing piece 28. The staging projection 90 is positioned within the housing 22 and projects into the interior of the housing from a main side of the first housing piece 28. The staging projection 90 is depicted as having a relatively stiff, flat, strip-like configuration. In certain examples, ribs (e.g., longitudinal ribs or transverse ribs) may be provided on the staging projection 90 so as to enhance friction when engaged with a corresponding component desired to be staged. In the present example, the component desired to be staged is the fiber optic assembly 32. To achieve this, the fiber optic assembly 32 preferably includes a structure designed to receive or otherwise mate or engage with the staging projection 90. Longitudinal ribs 91 are shown at FIG. 3 for reinforcing the projection 90. For example, as shown at FIGS. 7, 8 and 11, the fiber routing tray 78 can include staging receptacle 92 accessible from a back side of the fiber routing tray 78. The back side of the fiber routing tray 78 is the side opposite from where the splice tray 80 is mounted. Typically, the backside of the fiber routing tray 78 is not required to be accessed as readily in the field.

Referring to FIG. 11, the staging receptacle 92 includes at least one and preferably two opposing retention arms 94 adapted to engage the staging projection 90 when the staging projection 90 is inserted into the staging receptacle 92. The retention arms 94 can have a cantilevered configuration with base ends 96 and free ends 98. The retaining arms 94 are configured to flex about their base ends 96 as the staging projection 90 enters the staging receptacle 92. In certain examples, staging projection 90 forces the retention arms 94 away from one another as the staging projection 90 is inserted into the staging receptacle 92. In certain examples, before and after insertion of the staging projection 90, the retention arms 94 are angled (see angle A) in a direction of insertion relative to an insertion axis 100. The insertion axis 100 extends through the staging receptacle 92 and is co-axially aligned with the staging projection at the time the staging projection is moved into the receptacle 92. Such angling can assist in better gripping of the staging projection 90 by the arms 94.

Figure 15:
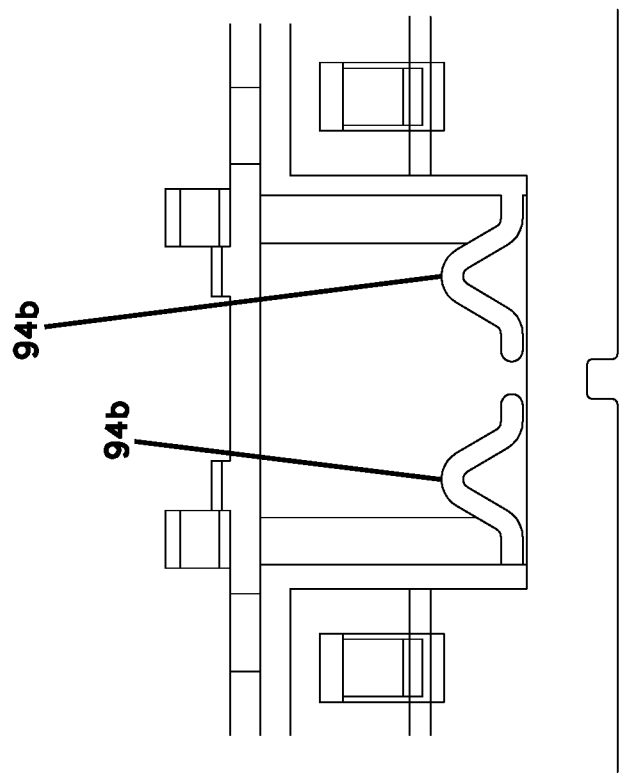
FIGS. 15 and 16 show alternative profiles for staging receptacles in accordance with the principles of the present disclosure.
Figure 16:
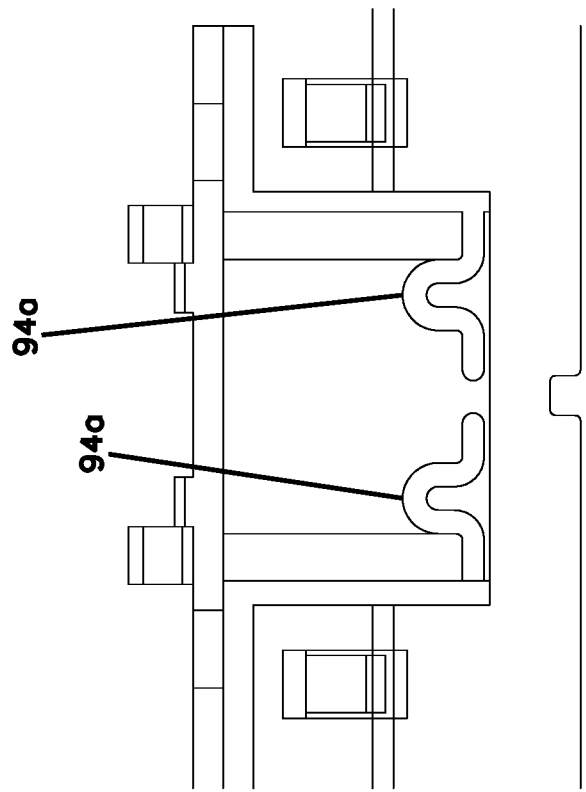

FIGS. 15 and 16 show alternative profiles for the staging receptacle 92. FIG. 15 shows arms 94*a* with rounded humps. FIG. 16 shows arms with angled humps 94*b*.

In certain examples, the staging structures can be engaged and disengaged easily. In certain examples, the fiber optic tray is not locked in place, but instead is held in such a way that it can be removed by applying sufficient force to overcome the frictional grip of the staging structures. In certain examples, no undercuts or difficult tooling are required. In certain examples, the retaining works by friction or limited deformation. In certain examples, the staged connection allows for limited movement of the tray while maintaining the general staged positioning. In certain examples, higher retention forces are used and triggers, cams, ramps or other features can be used to unlock or release the flexible arms from a retaining position.

Referring to FIGS. 3-10, the sealing subassembly 42 includes a first set of co-axially aligned upper and lower clamps 102*a*, 102*b* and a second set of co-axially aligned upper and lower clamps 104*a*, 104*b*. Each of the clamps includes a pivotal clamping arms 103*a*, 103*b* and defines a pocket 107 in which an insert 106 is mounted. The clamping arms 103 are moveable between open and closed positions. The clamping arms 103 can be pivotally connected to a main clamp frame 105. The inserts 106 can define a plurality of port openings defining the cable ports. It will be appreciated that different styles and configurations of inserts can be utilized to accommodate different sizes and shapes of cables. The sealant subassembly 42 includes cable sealant 37 positioned within the cable clamps (i.e., the sealant can line the cable ports, and the clamping arms and can be configured to fully encompass and sandwich the cables routed through the cable ports). The cable sealant 37 is pressurized when the clamping arms 103 are and flows to fill in any voids. Thus, the cable sealant 37 provides fluid tight seals around each of the cables routed through the cable ports. The clamp arms 103*a*, 103*b* are pivotally movable between open and closed positions and provide a lever action so as to provide relatively high pressurization forces for pressurizing the sealant. Example sealant materials include gel, mastic, rubber, elastomeric material or other materials or composites thereof.

In certain examples, the first housing piece 28 and/or the second housing piece 30 may define pockets 200, 202 for respectively receiving the upper clamps 102*a*, 104*a* and the lower claims 102*b*, 104*b*. The first housing piece 28 and/or the second housing piece 30 may also define a pocket 203 for receiving an intermediate sealing section 108 of the sealing subassembly 42. Intermediate sealing section 108 is positioned between the upper and lower clamps and can include housing sealant 52 that contacts the cable sealant 37 that also contacts portions of the housing 22 so as to form an effective seal at the open end 24 of the housing 22. Springs can be utilized to apply pressurization force to the housing sealant. Example sealant materials for the housing sealant 52 include gel, mastic, rubber, elastomeric material or other materials or composites thereof.

As used herein, ruggedized fiber optic connectors can include male fiber optic connections and female fiber optic connectors. As used herein, a ruggedized fiber optic connector is more rugged than a typical fiber optic connector designed for indoor use such as an SC connector or an LC connector. In certain examples, ruggedized fiber optic connectors can include coupling elements that are relatively robust and can also include sealing interfaces for provided sealed connections when mated with a corresponding fiber optic adapter or fiber optic connector. In certain examples, robust coupling elements can include rotatable couplers such as bayonet-style couplers or threaded couplers.

Figure 12:
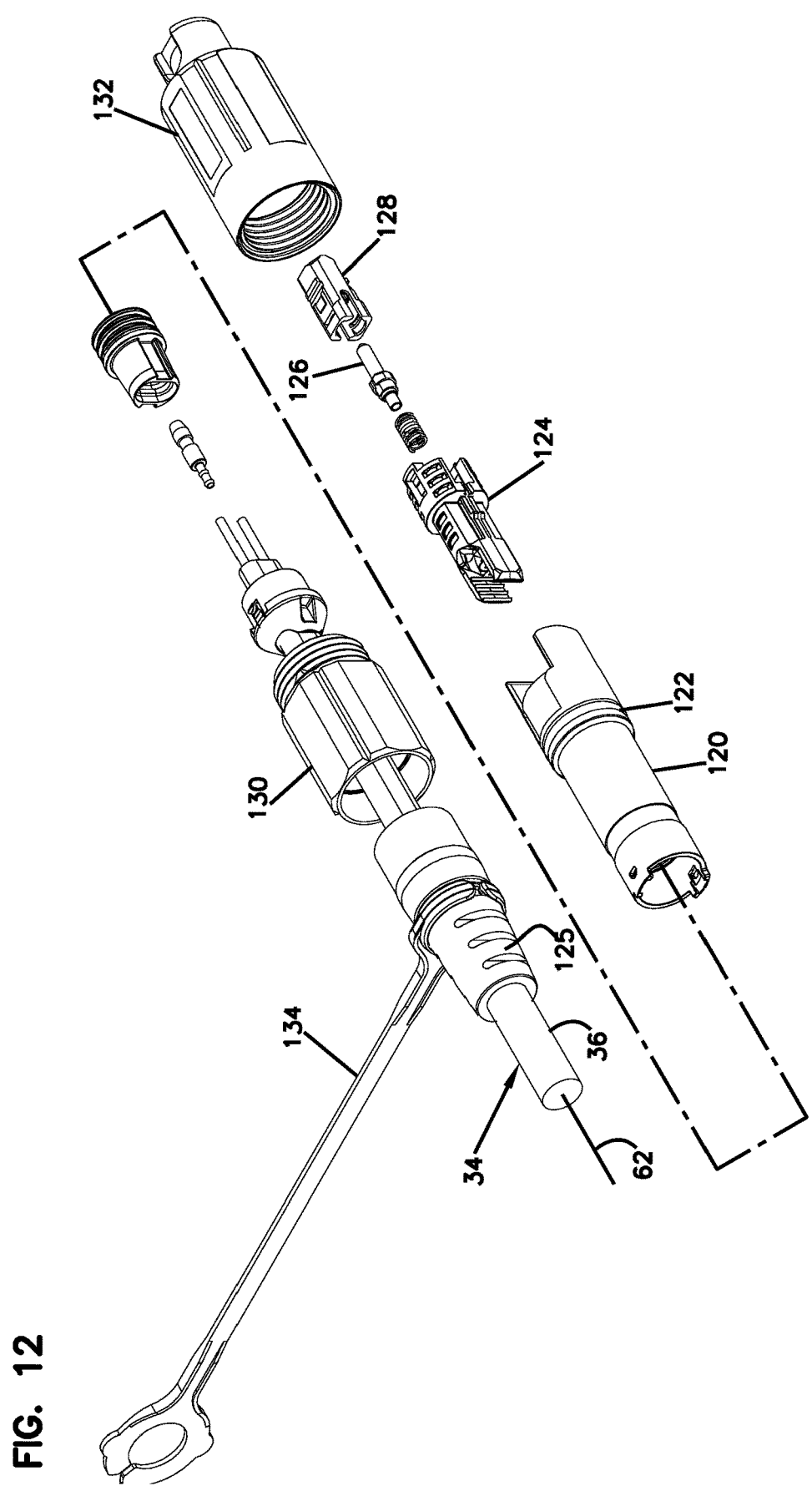
FIG. 12 is an exploded view of an example ruggedized fiber optic connector that can define the ends of the tethers of the optical fiber distribution apparatus of FIG. 1.
Figure 17:
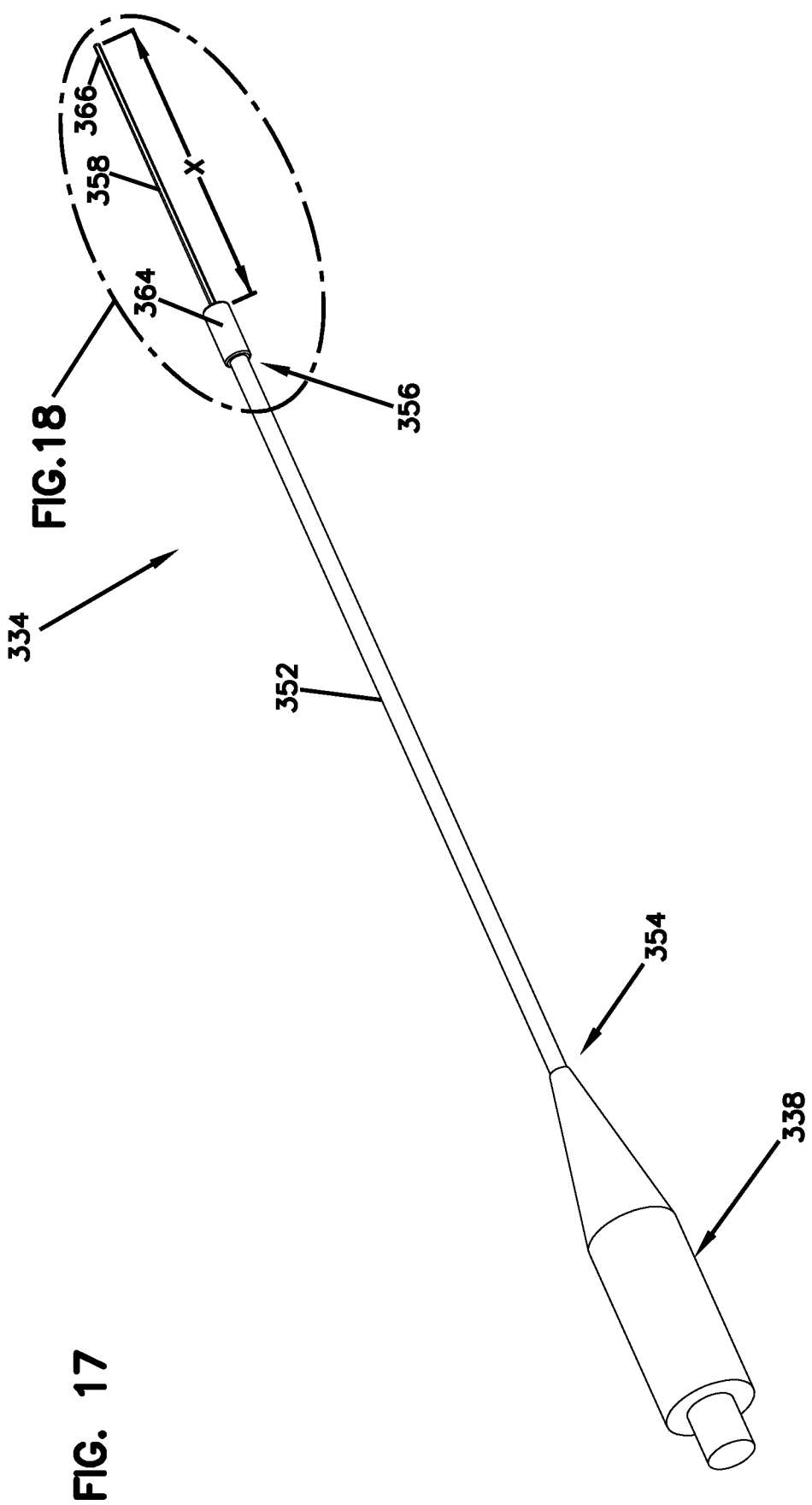
FIG. 17 is a schematic view of a tether assembly in accordance with the principles of the present disclosure.

FIG. 12 illustrates a first example configuration for the ruggedized fiber optic connectors 38, 338 (see FIG. 17). The configuration includes an outer housing 120 supporting an outer seal 122. The configuration also includes an inner body 124 supporting a ferrule 126 in which an optical fiber 62 of the tether is supported. A connector body 128 is positioned at least partially over the ferrule 126. A rotatable coupler 130 in the form of a threaded nut mounts over the outer housing 120. The tether cable 36 is preferably anchored to the inner body 124 (e.g., aramid yarn or other strength members of the tether cable can be adhesively secured or mechanically crimped to the inner body 124). When not in use, the connector body 128 and the ferrule 126 can be protected and sealed within a dust cap 132. A lanyard 134 can connect the dust cap to the remainder of the connector. A boot 125 is provided at a back end of the connector. To couple the fiber optic connector to another connector, the dust cap is removed to provide access to the plug. Further details about this type of connector can be found at PCT Publication No. WO 2013/177016, which is hereby incorporated by reference in its entirety.

Figure 13:
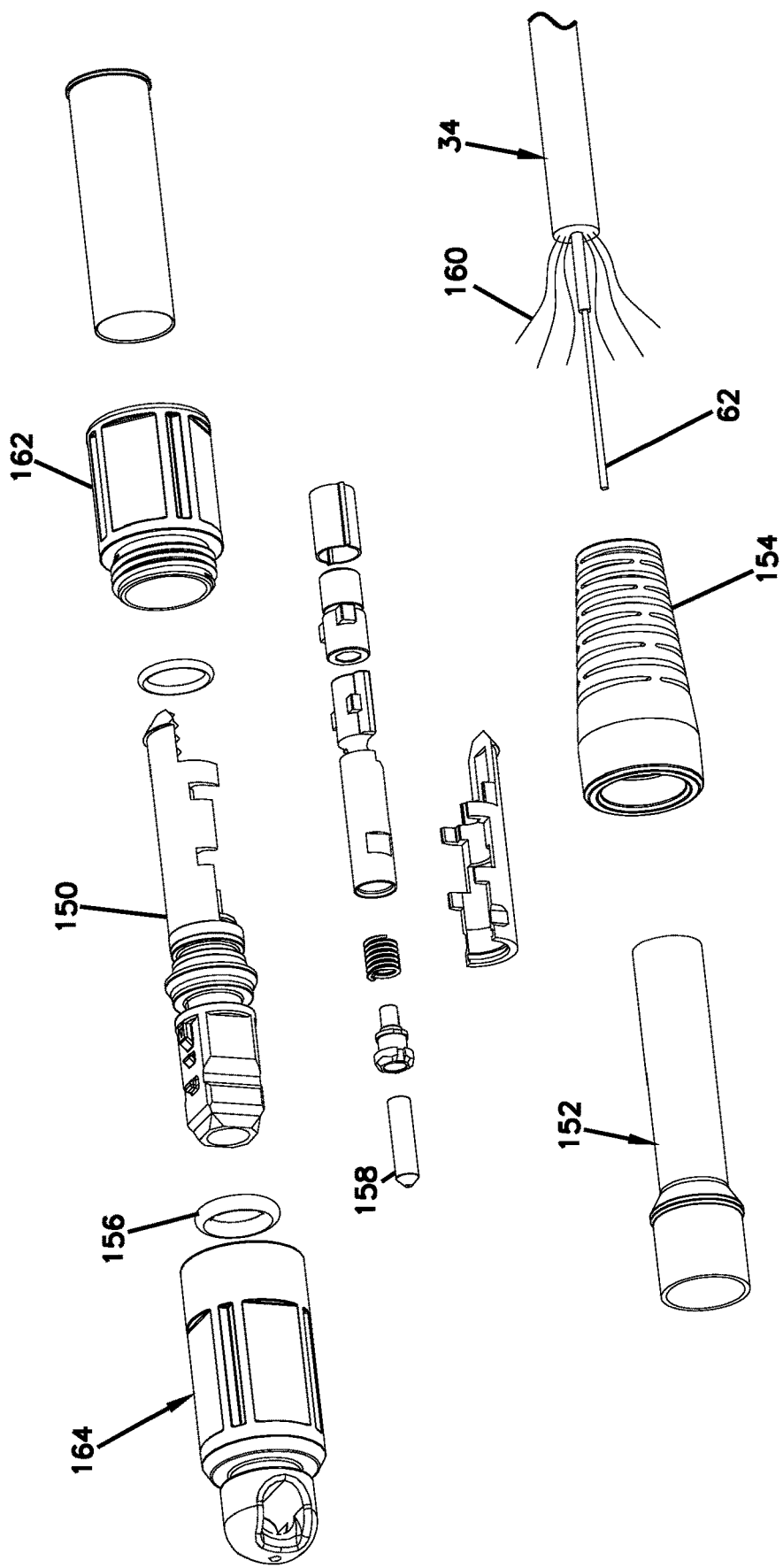
FIG. 13 is a perspective view of another ruggedized connector that can define the ends of the tethers of the optical fiber distribution apparatus of FIG. 1.

FIG. 13 shows another configuration for a ruggedized fiber optic connector suitable for use with the tethers 34, 334 (see FIG. 17). The fiber optic connector includes a connector body 150 sealed relative to the optical tether cables 36 by a heat shrink sleeve 152. A boot 154 provides bend radius protection at the interface between the tether cable 36 and the ruggedized fiber optic connector. The connector body 150 carries a seal 156 and supports a spring-loaded ferrule 158 therein. The ferrule 158 can support an optical fiber 62 of the tether cable 36. In certain examples, strength members 160 of the tether cable 36 can be anchored to the connector body 150 by a crimp, adhesive or other structures. A robust coupler 162 such as a threaded nut or bayonet-style coupler can be mounted about the exterior of the connector body 150. A dust cap 164 can be used to temporarily cover and protect the ferrule 158 when not in use. By removing the dust cap 164, the connector is available for connection to another connector or to a fiber optic adapter. Further details about this type of connector are disclosed at U.S. Pat. No. 7,942,590, which is hereby incorporated by reference in its entirety.

Figure 14:
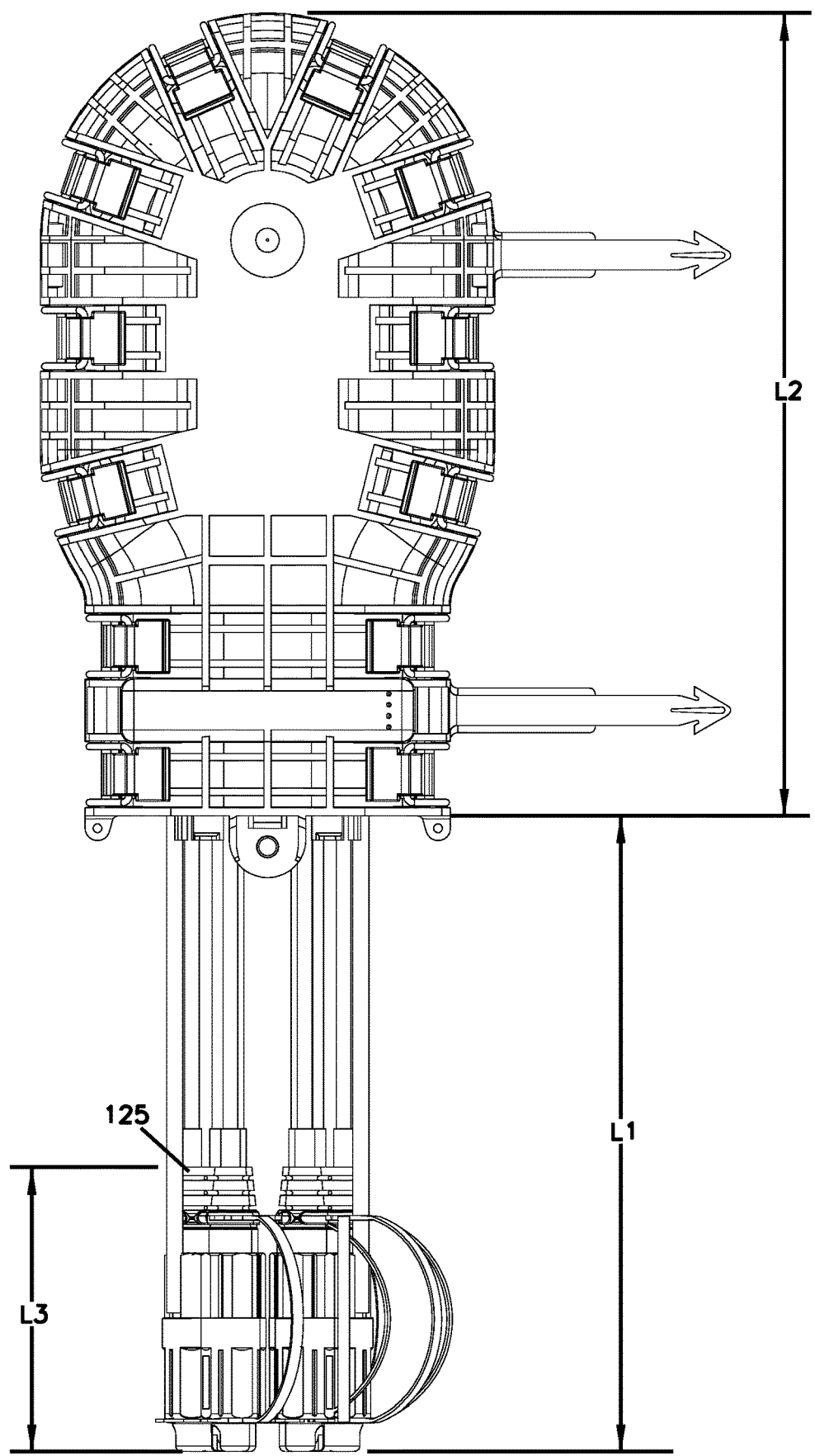
FIG. 14 is a front view of the fiber distribution apparatus of FIG. 1.

In certain examples, the tethers 34 are relatively short and flexible. This allows the ruggedized fiber optic connectors 38 to be relatively close to the housing 22 and also allows the connectors to be moved to better receive drop cables directed from different angles or positions. In certain examples, the tethers 34 have lengths L1 (see FIG. 14) that extend from the housing 22 to the tips of the dust caps of the ruggedized fiber optic connectors 38. The ruggedized fiber optic connectors 38 have lengths L2 that extend from a tip of the boot to the tip of the dust cap. The housing 22 has a length L3 that extends from the butt end 26 to the open end 24. In certain examples, the lengths L1 of the tethers are each less than the length L3 of the housing 22. In certain examples, the lengths L1 of the tethers are less than 1.25, 1.5, 2.0, or 3.0 times as long as the length L3 of the housing. In certain examples, the lengths of the tethers L1 are less than 3, 4, 5 five times as long as the lengths L3 of the ruggedized fiber optic connectors.

Figure 18:
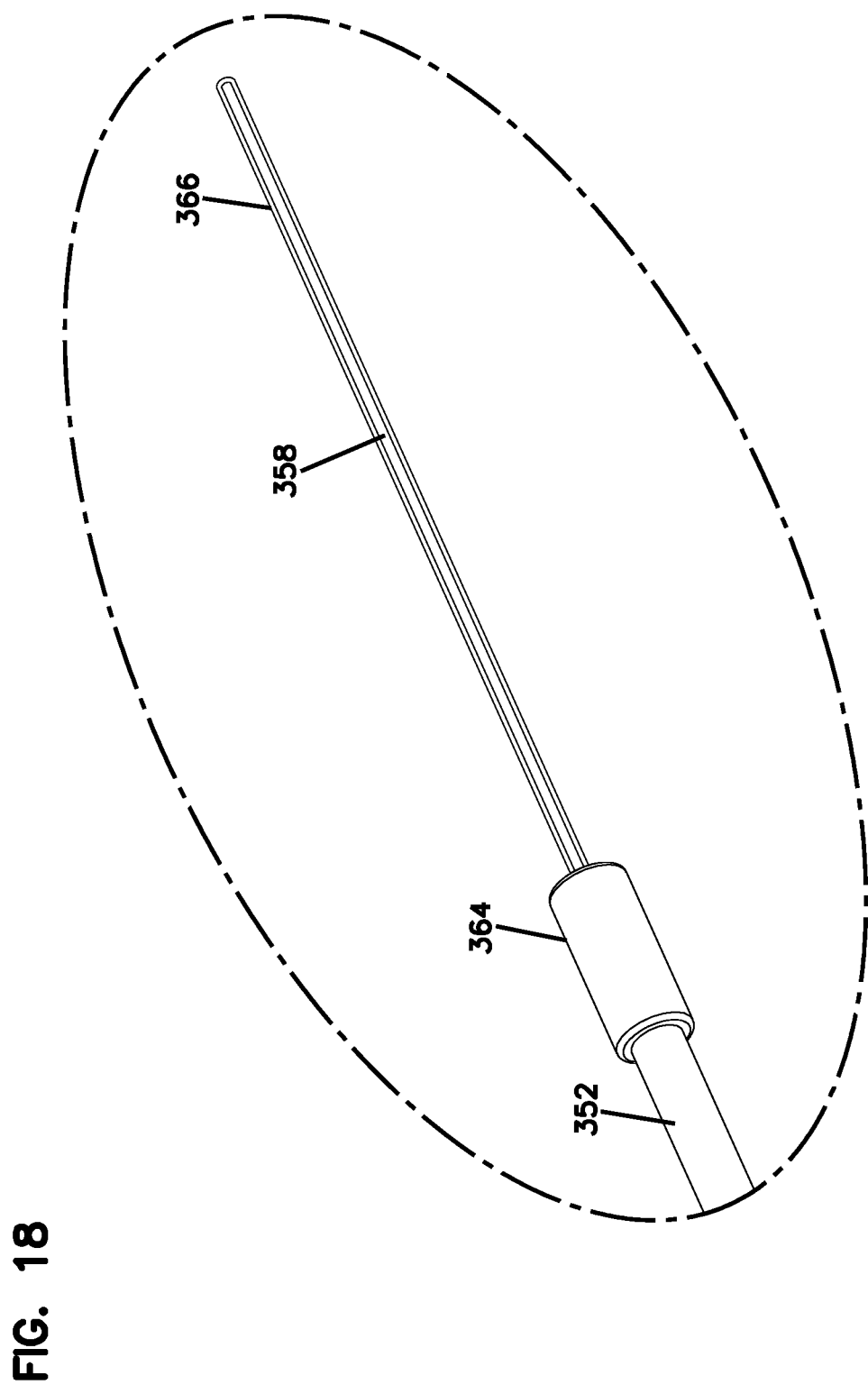
FIG. 18 is an enlarged view of a portion of the tether assembly shown in FIG. 17 depicting an overmold in accordance with the principles of the present disclosure.
Figure 19:
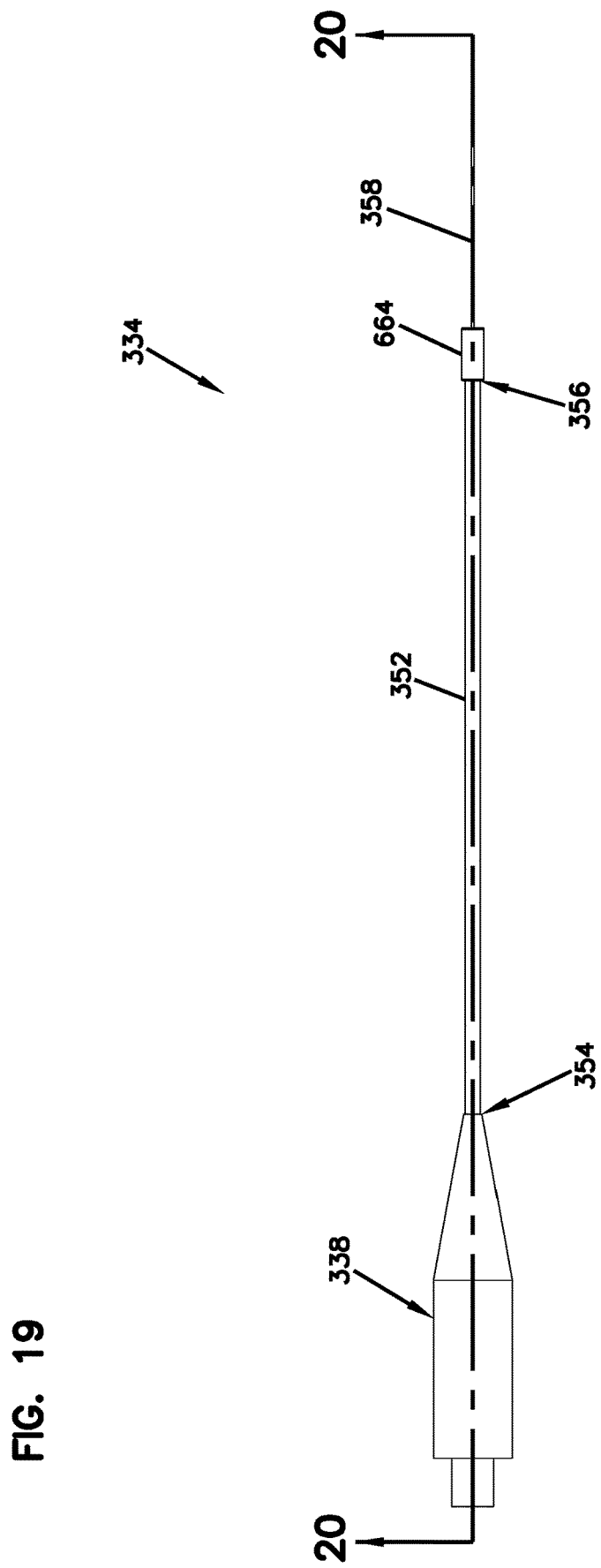
FIG. 19 is still another schematic view of the tether assembly of FIG. 17.

FIGS. 17-19 illustrate an example tether assembly 334 (e.g., furcation tube, pig tail) in accordance with the principles of the present disclosure. In one example, the tether assembly 334 can be similar to the tether 34 described above with reference to FIGS. 3-10. The tether assembly 334 can have a first end 354 and a second end 356. The tether assembly 334 may be designed as an indoor cable (e.g., plenum cable, interconnector cable, low-smoke zero-halogen cable, etc.), an outdoor cable (e.g., drop cable), or an indoor/outdoor cable. The tether assembly 334 can include a cable jacket 352 or exterior that surrounds a communication line, such as an optical fiber 358. In some examples, the tether assembly 334 may include a plurality of optical fibers, and may also be narrower and/or of shorter length than the cable 50, or of an entirely different geometry altogether. The cable jacket 352 of the tether assembly 334 can include a non-polar material, such as polyethylene, polyethylene mixed with carbon black, or another such material.

A fiber optic connector 338 is shown mounted at the first end 354 of the cable jacket 352. At least one optical fiber 358 can extend through the cable jacket 352, although alternatives are possible. For example, the cable jacket 352 may include a plurality of optical fibers. The at least one optical fiber 358 can be arranged and configured to project a first distance X beyond the second end 356 of the cable jacket 352.

Figure 20:
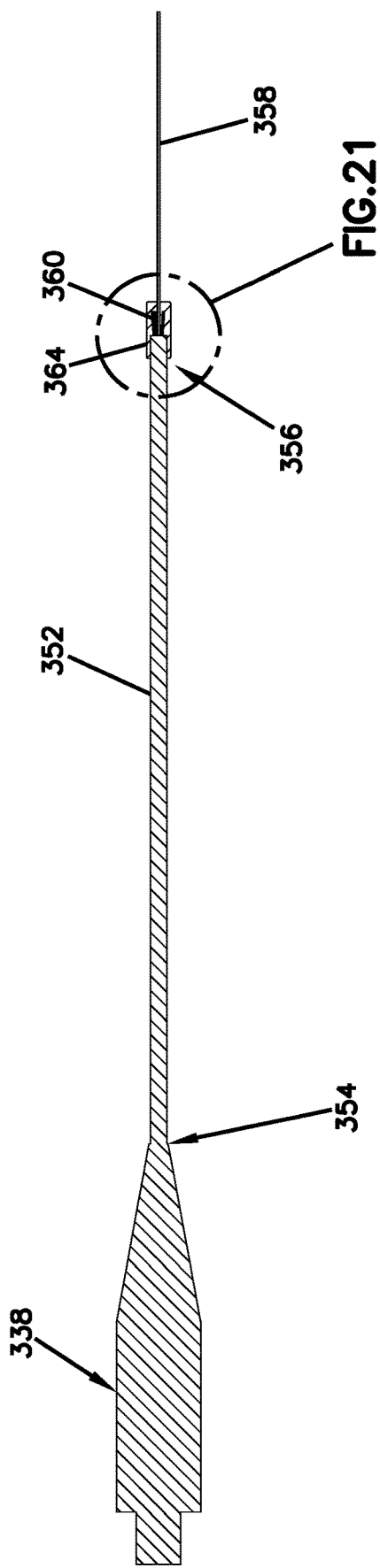
FIG. 20 is a cross-sectional view taken along section 20-20 of the tether assembly of FIG. 19.
Figure 21:
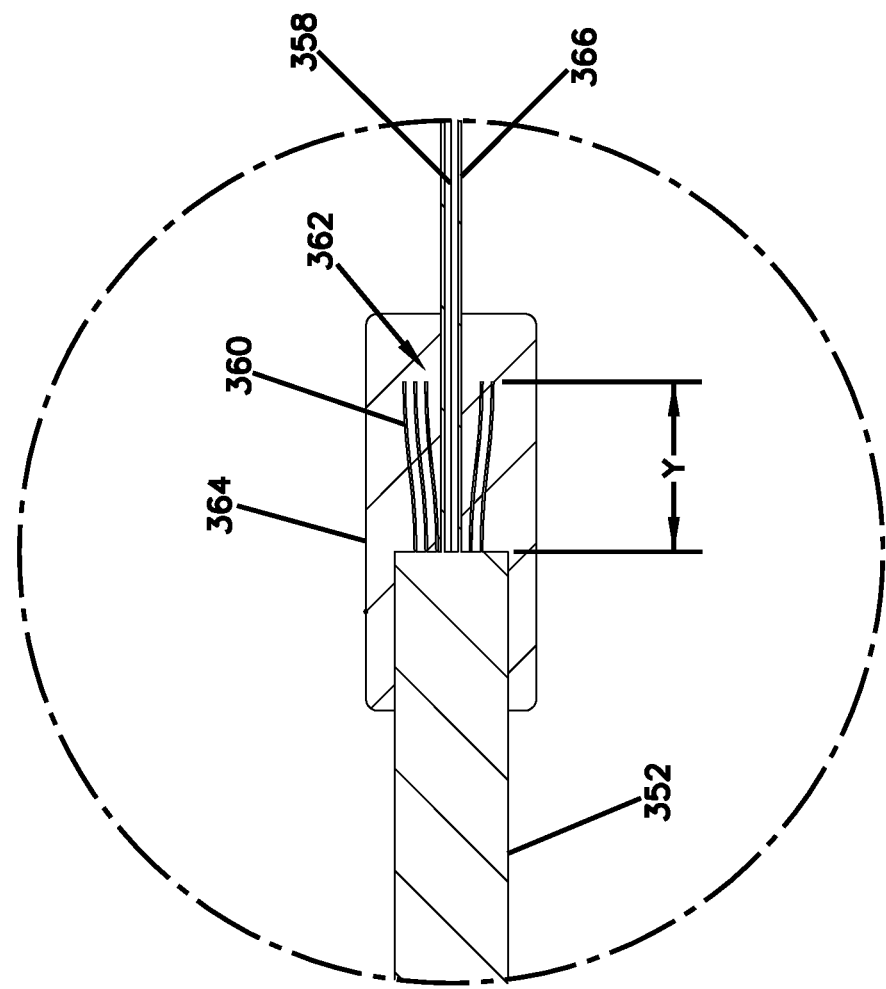
FIG. 21 is an enlarged cross-sectional view of a portion of the tether assembly of FIG. 20 depicting the overmold.

Referring to FIGS. 20-21, strength members 360 (e.g., aramid yarn, fiberglass, reinforcing rods formed by fiberglass reinforced epoxy, reinforcing member, etc.) may be embedded in the cable jacket 352 and extend therethrough. In certain examples, the strength member or members 360 can be flexible and inelastic and can be capable of resisting tensile load but not carrying meaningful compressive load (e.g., like aramid yarn or other string or yarn-like strength element). In one example, the cable jacket 352 can be stripped to expose a portion of a protective buffer tube 366 (e.g., a loose buffer tube, a tight buffer tube, a semi-tight buffer tube or like structures) and the strength members 360. The at least one optical fiber 358 can be contained within the protective buffer tube 366.

The strength members 360 can include end portions 362 that project a second distance Y beyond the second end 356 of the cable jacket 352. In certain examples, the strength members 360 can be loaded into the cable jacket 352 such that the end portions 362 project a desired distance from the second end 356 of the cable jacket 352.

The second distance Y of the strength member 360 can be shorter than the first distance X of the at least one optical fiber 358. The first distance X of the optical fiber 358 is preferably long enough to allow for fusion or mechanical splicing of the optical fiber 358 in the field and for allowing the optical fiber 358 to be routed to a splice location or other location. In certain examples, the first distance X of the at least one optical fiber 358 can be 2.0, 4.0, 6.0, 8.0, or 10.0 times as long as the second distance Y of the strength members 360, although alternatives are possible. In one example, the second distance Y of the strength member 360 is typically between 2 mm and 30 mm, although alternatives are possible. For example, the second distance Y of the strength member 360 can be between 4 mm and 20 mm. In still other examples, the second distance Y of the strength member 360 can be between 6 mm and 10 mm.

The tether assembly 334 can include an overmold 364 positioned adjacent the second end 356 of the cable jacket 352. The tether assembly 334 can be loaded into an overmold tool to be overmolded with a rubber material or any other polymeric material. The cable jacket 352 can be stripped to expose the strength members 360 and to expose the buffer tube 366. The overmold 364 can be applied over a portion of the strength members 360 that are exposed and a portion of the cable jacket 352.

The overmold tool can overmold a plurality of tether assemblies 334 together at one time. The overmold 364 can be applied over a portion of the cable jacket 352 and over a portion of the strength members 360 that extends from the second end 356 of the cable jacket 352. In certain examples, the overmold 364 is applied completely over the strength members 360 that are extending out of the cable jacket 352 such that whole lengths of the strength members 360 are covered. The overmold 364 can be arranged and configured to secure, anchor, and/or support the end portions 362 of the strength members 360 to the second end 356 of the cable jacket 352. As such, the strength members 360 can be anchored relative to the cable jacket 352. The overmold 364 can further cover the buffer tube 366 to anchor the buffer tube 366 relative to the cable jacket 352.

The overmold 364 can be used to anchor, secure, and/or support the strength members 360 and/or the buffer tube 366 relative to the cable jacket 352. The strength members 360 no longer need to be separately fixed or secured to the housing 22. The overmold 364 allows the strength members 360 to be fixed relative to the cable jacket 352 and the cable jacket 352 can subsequently be clamped, or otherwise secured, fixed, or anchored to the housing 22. As such, the cable jacket 352 and the strength members 360 can be anchored.

The overmold 364 can be a separate component of the tether assembly 334 that covers only a section thereof, and can be applied to the already-manufactured tether assembly 334, as opposed to being a layer extruded with and part of the tether assembly 334. Such an overmold 364 may be applied in a factory or in the field. The tether assembly 334 can be a pre-assembled for use as a building block in telecommunications networks. The preassembled tether assembly 334 can be sealed off and spliced to a sealing unit as desired.

One advantage of such a design is that the overmold 364 provides for axial retention within the tether assembly 334 due to the overmolded strength members 360. Another advantage of the overmold 364 is that anchoring the buffer tube 366 relative to the cable jacket 352 can help to prevent the buffer tube 366 from sliding within the tether assembly 334. Still another advantage of the overmold 364 is that it provides for only a single jacket fixation. An extra fixation on a sealing unit or closure is not needed, which helps to provide for an easier manufacturing process.

The overmold 364 can be made with a polymeric material, although alternatives are possible. The polymeric material can include styrenic block copolymers, polyolefin blends, elastomeric alloys, polyurethanes, copolymers and/or polyamides.

Figure 22:
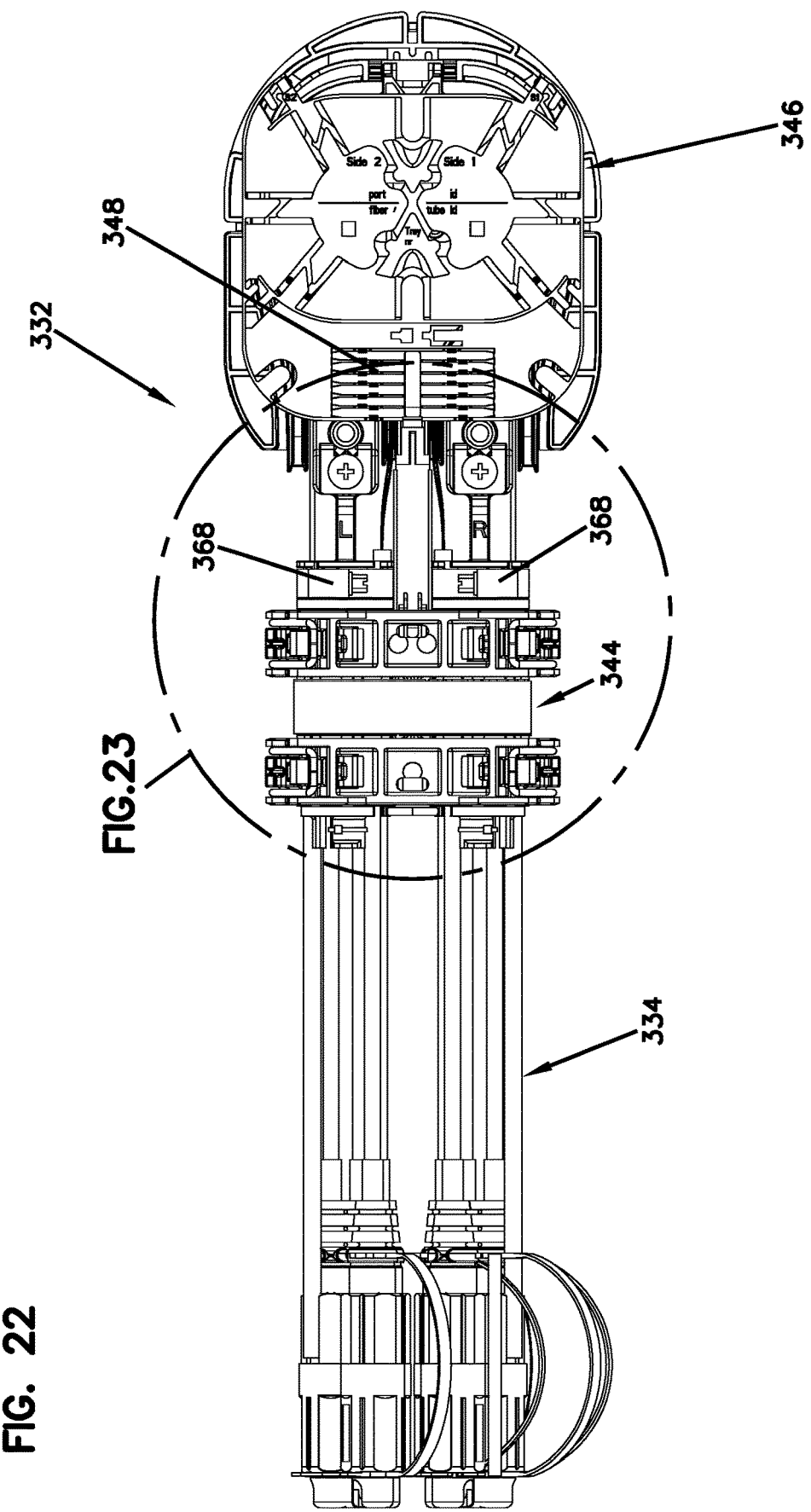
FIG. 22 is a perspective view of the fiber optic assembly of FIGS. 4-8 depicting a sealing subassembly in accordance with the principles of the present disclosure.
Figure 23:
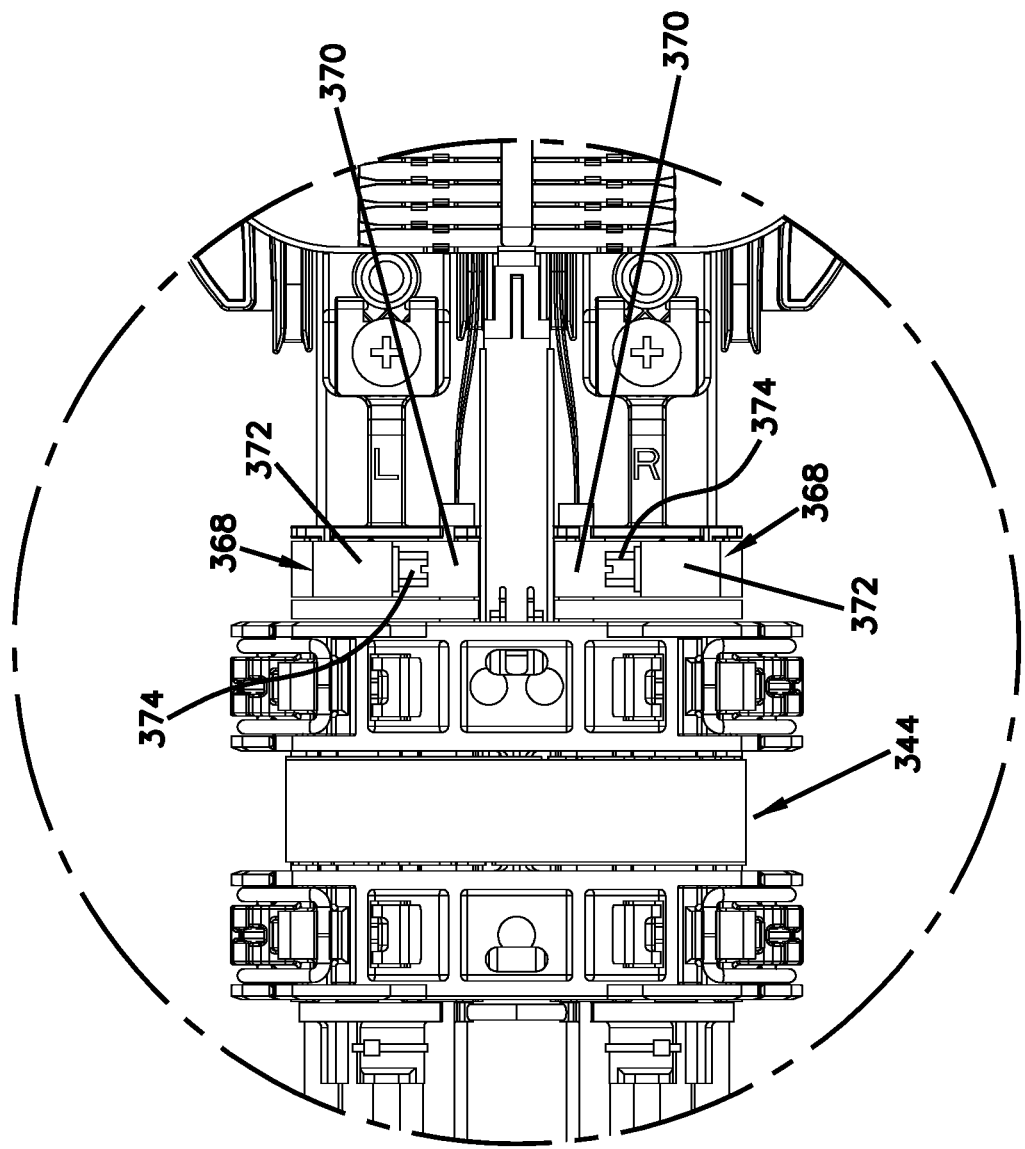
FIG. 23 is an enlarged view of a portion of the fiber optic assembly shown in FIG. 22.

Referring to FIGS. 22 and 23, the sealing subassembly 344 is shown mounted to the tether assembly 334. In one example, the sealing subassembly 344 can be attached or secured to the cable jacket 352 anywhere from the first end 354 to the second end 356 of the cable jacket 352 of the tether assembly 334 because the strength members 360 are anchored relative to the cable jacket 352 to provide pull retention and/or axial retention. In other examples, the sealing subassembly 344 can be attached or secured to the overmold 364 of the tether assembly 334.

The sealing subassembly 344 can be attached or secured by using a mechanical fastener 368 (e.g., hook-n-loop, zip tie, clamp, hose clamp, and the like) for fixing the tether assembly 334 in place relative to the sealing subassembly 344. In the example shown, a hose clamp 368 is used, although alternatives are possible. The structure of a typical hose clamp includes an elongated band 370, a fastener housing 372 that tensions the elongated band 370 and reduces its interior diameter, as well as a captive fastener 374 used to advance the elongated band 370 through the fastener housing 372.

In the example depicted, four tether assemblies 334 are shown and two hose clamps 368 are located adjacent to the sealing subassembly 344. Each of the two hose clamps 368 secure two tether assemblies 334, respectively. The mechanical fastener 368 may be made of any suitable metal, such as but not limited to, stainless steel. In other examples, the mechanical fastener 368 can be made of a non-metal, such as but not limited to, plastic (e.g., polyetheretherketone—PEEK).

Exposed optical fibers of the pass-through cable 50 can be routed and managed on the tray structure 346 (see FIG. 22). As indicated above, certain ones of the optical fibers of the pass-through cable 50 are pass-through fibers that are not cut and that extend continuously through the optical fiber distribution apparatus 20. Other optical fibers of the pass-through cable 50 may be cut, routed on the tray structure 346 and spliced to the tether fibers 358. The splices can be fusion splices that are protected by splice protectors (not shown) (e.g., a protective tube or sleeve). The splice protector can be stored and protected by splice holders 348 (see FIG. 22) of the tray structure 346. The splice holders 348 can include grooves, slots, grips, fingers, recesses or other structures suitable for holding splice protectors.

It will be appreciated that the configuration of the ruggedized fiber optic connectors 38 described above with reference to FIG. 12 can also apply to the ruggedized fiber optic connectors 338 of FIG. 17. Also, it will be appreciated that the configuration shown in FIG. 13 can also be suitable for use with the tether 334 of FIG. 17.

The present disclosure also relates to a method for securing the strength members 360 to the cable jacket 352. The strength members 360 include the end portions 362 that project beyond an end 356 of the cable jacket 352. The method can include the step of applying the overmold 364 over the end 356 of the cable jacket 352 such that the strength members 360 are anchored relative to the cable jacket 352. The method can further include a step of pre-loading the strength members 360 in the cable jacket 352. The method can include a step of stripping away a portion of the cable jacket 352 to expose the strength members 360.

In certain examples, the method can include a step of securing the sealing subassembly 344 (e.g., sealing block) to the overmold 364 of the tether assembly 334 by using the mechanical fastener 368 for fixing the cable jacket 352 in place relative to the sealing subassembly 344. In other examples, the method can include a step of securing the sealing subassembly 344 to the cable jacket 352 using the mechanical fastener 368 for fixing the cable jacket 352 in place relative to the sealing subassembly 344.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. An optical fiber distribution apparatus comprising:
   a housing having an open end and a butt end, the housing including first and second housing pieces that mate together to define the housing, each of the first and second housing pieces extending from the butt end to the open end of the housing;
   a fiber optic assembly adapted to be installed partially within the housing, the fiber optic assembly comprising:
      a plurality of tethers having optical tether cables including free ends connectorized by ruggedized fiber optic connectors, the tether cables being configured to project outwardly from the open end of the housing when the fiber optic assembly is installed at the housing, thus forming an exterior portion of the fiber optic assembly;
      an interior portion of the fiber optic assembly that mounts inside the housing when the fiber optic assembly is installed at the housing, the interior portion of the fiber optic assembly comprising:
         a sealing subassembly that mounts within the housing adjacent to the open end of the housing when the fiber optic assembly is installed at the housing, the sealing subassembly including sealant for sealing around the optical tether cables and for sealing the open end of the housing, the sealing subassembly also defining first and second pass-through cable ports in which a pass-through cable can be routed and sealed; and
         a tray structure mechanically coupled to the sealing subassembly, the tray structure being positioned between the sealing subassembly and the butt end of the housing when the fiber optic assembly is installed at the housing, the tray structure including a plurality of splice holders and a plurality of fiber routing paths, at least one of the fiber routing paths defining a fiber pass-through path for guiding pass-through fibers of the pass-through cable as the pass-through fibers are routed from the first pass-through cable port to the second pass-through cable port;
   wherein the first housing piece includes a staging projection, and wherein the tray structure defines a receptacle that receives the staging projection during installation to hold the tray structure and the remainder of the fiber optic assembly in place relative to the first housing piece while the second housing piece is mated relative to the first housing piece;
   wherein the receptacle includes at least one flexible retention arm that engages the staging projection and flexes to generate friction between the flexible arm and the staging projection for assisting in retaining the tray structure in place on the staging projection; and
   wherein the receptacle includes two opposing flexible retention arms each having a cantilevered configuration, wherein the staging projection fits between the flexible retention arms when inserted into the receptacle, thereby causing the flexible retention arms to flex apart to accommodate the staging projection and to apply a retention load force on the staging projection that frictionally retains the staging projection within the receptacle.

2. The optical fiber distribution apparatus of claim 1, wherein the optical tether cables are loaded into the sealing subassembly at the factory.

3. The optical fiber distribution apparatus of claim 2, wherein the optical tether cables include optical fibers routed to the tray structure at the factory.

4. The optical fiber distribution apparatus of claim 1, wherein the first and second housing pieces each form a half of the housing.

5. The optical fiber distribution apparatus of claim 1, further comprising a perimeter seal captured between the first and second housing pieces that seals a perimeter of the housing at a sealing interface defined between the first and second housing pieces.

6. The optical fiber distribution apparatus of claim 1, wherein the fiber optic assembly is installed to the housing as a unit.

7. The optical fiber distribution apparatus of claim 1, wherein the staging projection or at least one the flexible retention arms includes retention ribs for enhancing a gripping action between the staging projection and the retention arms.

8. The optical fiber distribution apparatus of claim 7, wherein a technician can use one hand to hold the first housing piece and a second hand to hold the fiber optic assembly as the tray structure is installed on the staging projection, and the technician can use one hand to hold the first housing piece and the staged fiber optic assembly and the second hand to hold the second housing piece to mate to the first and second housing pieces together after the fiber optic assembly has been staged with the first housing piece.

9. The optical fiber distribution apparatus of claim 8, wherein the first and second housing pieces are clamped together by a plurality of clamps positioned about the perimeter of the housing.

10. The optical fiber distribution apparatus of claim 1, wherein the tray structure includes a fiber routing tray mechanically fixed relative to the sealing subassembly, wherein the fiber routing tray defines the fiber pass-through path, and wherein the tray structure includes a splice tray pivotally connected to the fiber routing tray.

11. The optical fiber distribution apparatus of claim 1, wherein the sealing subassembly includes a first set of co-axially aligned upper and lower clamps and a second set of co-axially aligned upper and lower clamps, each of the clamps includes an interior insert defining a plurality of cable ports for receiving the optical tether cables, the interior inserts also defining the pass-through cable ports, the sealant subassembly including cable sealant that lines the plurality of cable ports and is positioned within the clamps so as to be pressurized when the clamps are moved from open to closed positions.

12. The optical fiber distribution apparatus of claim 11, wherein at least the first housing piece defines a first pocket for receiving the upper clamps and a second pocket for receiving the lower clamps.

13. The optical fiber distribution apparatus of claim 12, wherein at least the first housing piece defines a third pocket between the first and second pockets, and wherein the sealing subassembly includes housing sealant that fits within the third pocket, the housing sealant sealing the open end of the housing contacting the cable sealant.

14. An optical fiber distribution component comprising:

a housing including first and second mating housing pieces, at least one of the housing pieces including a staging projection; and an optical component that mounts at least partially within the housing, the optical component having a receptacle for receiving the staging projection, wherein the optical component includes a fiber management tray, a sealing assembly, and a plurality of ruggedized tethers, the ruggedized tethers being configured to project outwardly from an open end of the housing thus forming an exterior portion of the optical component.

15. The optical fiber distribution component of claim 14, wherein the optical component includes an interior portion and the exterior portion.

* * * * *